United States Patent
Zhang

(10) Patent No.: US 11,807,261 B2
(45) Date of Patent: Nov. 7, 2023

(54) EGO-VEHICLE WARNING METHOD AND APPARATUS

(71) Applicant: Huawei Technologies Co., Ltd., Shenzhen (CN)

(72) Inventor: Hao Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 80 days.

(21) Appl. No.: 17/635,809

(22) PCT Filed: Aug. 26, 2020

(86) PCT No.: PCT/CN2020/111510
§ 371 (c)(1),
(2) Date: Feb. 16, 2022

(87) PCT Pub. No.: WO2021/037087
PCT Pub. Date: Mar. 4, 2021

(65) Prior Publication Data
US 2022/0289223 A1    Sep. 15, 2022

(30) Foreign Application Priority Data

Aug. 26, 2019 (CN) .......................... 201910792798.0

(51) Int. Cl.
*H04N 5/44* (2011.01)
*B60W 50/14* (2020.01)
(Continued)

(52) U.S. Cl.
CPC ........ *B60W 50/14* (2013.01); *B60W 30/0956* (2013.01); *B60W 40/114* (2013.01);
(Continued)

(58) Field of Classification Search
CPC ............. B60W 50/14; B60W 30/0956; B60W 40/114; B60W 2050/146; B60W 2554/80; B60W 2556/45
See application file for complete search history.

(56) References Cited

U.S. PATENT DOCUMENTS 9,495,874 B1 * 11/2016 Zhu ........................ G06N 20/00
2009/0228172 A1    9/2009 Markyvech et al.
(Continued)

FOREIGN PATENT DOCUMENTS

| CN | 103144633 A | 6/2013 |
| CN | 104753691 A | 7/2015 |

(Continued)

OTHER PUBLICATIONS

"Cooperative intelligent transportation system; vehicular communication; application layer specification and data exchange standard," T/CSAE 53-2017, Sep. 18, 2017, 127 pages.
(Continued)

*Primary Examiner* — Munear T Akki
(74) *Attorney, Agent, or Firm* — Conley Rose, P.C.

(57) ABSTRACT

An ego-vehicle warning method includes determining a nearby area of an ego-vehicle based on moving information of the ego-vehicle, performing target classification on vehicles surrounding the ego-vehicle to obtain nearby vehicles in a plurality of directions and remote vehicle sets in the plurality of directions, for any remote vehicle in a remote vehicle set, calculating a shortest distance between the remote vehicle and a nearby vehicle in each direction that matches a direction of the remote vehicle in the plurality of directions in a future time period, and recording a time T when the shortest distance is less than a threshold D, and sending alarm information to a driver of the ego-vehicle based on the recorded time T.

20 Claims, 9 Drawing Sheets

(51) Int. Cl.
 *B60W 30/095* (2012.01)
 *B60W 40/114* (2012.01)
(52) U.S. Cl.
 CPC ... *B60W 2050/146* (2013.01); *B60W 2554/80* (2020.02); *B60W 2556/45* (2020.02)

(56) References Cited

U.S. PATENT DOCUMENTS

| | | | |
|---|---|---|---|
| 2012/0041632 A1 | 2/2012 | Garcia Bordes | |
| 2013/0173114 A1* | 7/2013 | Pillai | B62D 6/008 701/41 |
| 2013/0286205 A1* | 10/2013 | Okada | G06V 20/58 348/148 |
| 2014/0002657 A1* | 1/2014 | Kim | G06V 10/255 348/148 |
| 2014/0176714 A1* | 6/2014 | Li | G08G 1/166 348/148 |
| 2015/0025784 A1* | 1/2015 | Kastner | B60W 30/0956 701/119 |
| 2015/0298611 A1* | 10/2015 | Komoguchi | G08G 1/166 340/435 |
| 2017/0197549 A1* | 7/2017 | Vladimerou | B60W 30/08 |
| 2018/0261094 A1 | 9/2018 | Nishimura et al. | |
| 2021/0107471 A1 | 4/2021 | Saiki | |

FOREIGN PATENT DOCUMENTS

| | | |
|---|---|---|
| CN | 104933894 A | 9/2015 |
| CN | 104882025 B | 2/2017 |
| CN | 106781692 A | 5/2017 |
| CN | 206684953 U | 11/2017 |
| CN | 108569286 A | 9/2018 |
| CN | 109147394 A | 1/2019 |
| CN | 109591813 A | 4/2019 |
| CN | 109872567 A | 6/2019 |
| CN | 110111602 A | 8/2019 |
| CN | 110588510 A | 12/2019 |
| DE | 102016203086 A1 | 8/2017 |
| JP | 2017030435 A | 2/2017 |
| WO | 2005123440 A1 | 12/2005 |

OTHER PUBLICATIONS

IEEE Std 802.11p-2010, "IEEE Standard for Information technology—Telecommunications and information exchange between systems—Local and metropolitan area networks—Specific requirements Part 11: Wireless LAN Medium Access Control (MAC) and Physical Layer (PHY) Specifications, Amendment 6: Wireless Access in Vehicular Environments," IEEE Computer Society, Jul. 15, 2010, 51 pages.

SAEJ2735, "Dedicated Short Range Communications (DSRC) Message Set Dictionary," Mar. 2016, 267 pages.

SAEJ2945-1Y2016 SAE International, "On-Board System Requirements for V2V Safety Communications," Mar. 2016, 127 pages (with an English abstract).

\* cited by examiner

EGO-VEHICLE WARNING METHOD AND APPARATUS

CROSS-REFERENCE TO RELATED APPLICATIONS

This is a U.S. National Stage of International Patent Application No. PCT/CN2020/111510 filed on Aug. 26, 2020, which claims priority to Chinese Patent Application No. 201910792798.0 filed on Aug. 26, 2019. Both of the aforementioned applications are hereby incorporated by reference in their entireties.

TECHNICAL FIELD

Embodiments of this application relate to the intelligent transportation field, and in particular, to an ego-vehicle warning method and apparatus.

BACKGROUND

In a driving safety warning scenario, a vehicle collision warning such as a forward vehicle collision warning, a crossroad collision warning, a lane change warning, a reverse overtaking warning, a left turn assisted warning, or a blind zone warning has become a main application scenario of vehicle-to-vehicle (vehicle to vehicle, V2V) interaction. This fully demonstrates an important value of the vehicle collision warning for safe driving of a vehicle.

In existing vehicle-to-everything (vehicle to everything, V2X) communication, a method for warning an ego-vehicle moving on a road against a vehicle collision risk is as follows: The ego-vehicle obtains moving status data of the ego-vehicle, then obtains information such as a position, a moving speed, and a direction of a surrounding vehicle or a surrounding obstacle of the ego-vehicle with reference to a motion sensor of the ego-vehicle (such as a laser radar, a 360° panoramic camera, or a millimeter wave radar), then determines, according to a moving path prediction calculation method, whether the ego-vehicle will collide with the surrounding obstacle or the surrounding vehicle in a future time period, and when the ego-vehicle collides with the surrounding obstacle or the surrounding vehicle in the future time period, sends alarm information to a driver of the ego-vehicle, so that the driver adjusts a driving status of the ego-vehicle based on the alarm information, thereby avoiding the collision and implementing a collision warning between the ego-vehicle and the surrounding obstacle or the surrounding vehicle.

However, the existing vehicle warning method includes some disadvantages. For example, because the existing vehicle warning method mainly focuses on a discussion of the ego-vehicle and the surrounding vehicle or the surrounding obstacle, that is, focuses only on a collision risk between the ego-vehicle and things surrounding the ego-vehicle, and simply calculates whether the surrounding vehicle directly poses a collision threat to the ego-vehicle, but does not calculate adverse impact of a collision between other surrounding vehicles on the ego-vehicle. The method is subject to a "short-sighted" trap. When an accident occurs between the surrounding vehicle and another vehicle (for example, a collision occurs), an instantaneous change makes the driver of the ego-vehicle unable to respond in time, and finally, the ego-vehicle is inevitably involved in a series of accidents. Therefore, a safety warning capability of the vehicle is reduced.

SUMMARY

Embodiments of this application provide an ego-vehicle warning method and apparatus, to resolve a problem that a safety warning capability of an ego-vehicle is relatively low w % ben an accidental collision accident not caused by the ego-vehicle or another accident occurs between vehicles surrounding the ego-vehicle.

To achieve the foregoing objective, the following technical solutions are used in the embodiments of this application.

According to a first aspect, this application provides an ego-vehicle warning method, where the method includes: determining a nearby area of an ego-vehicle based on moving information of the ego-vehicle; performing target classification on vehicles surrounding the ego-vehicle to obtain a nearby vehicle closest to the ego-vehicle in a plurality of directions and relative to the ego-vehicle and a remote vehicle set including at least one remote vehicle in the plurality of directions; for any remote vehicle in the remote vehicle set, calculating a shortest distance between the remote vehicle and a nearby vehicle in each direction that matches a direction of the remote vehicle in the plurality of directions in a future time period, and recording a time T when the shortest distance is less than a threshold D; and using a nearby vehicle corresponding to an earliest time T among all recorded times T as a warning vehicle, and sending alarm information to a driver of the ego-vehicle, where the alarm information is used to indicate to the driver that an accidental collision accident not caused by the ego-vehicle or another accidental collision accident may occur in a direction of the nearby vehicle corresponding to the earliest time T, so that the driver drives carefully based on the alarm information and avoids an accident.

Based on the method according to the first aspect, nearby vehicles surrounding the ego-vehicle and associated with the ego-vehicle and a remote vehicle set including at least one remote vehicle may be determined based on the nearby area of the ego-vehicle, a time T at which each remote vehicle may collide with a nearby vehicle in a direction matching that of the remote vehicle is predicted, a nearby vehicle corresponding to an earliest time T is used as a most threatening vehicle for the ego-vehicle, and the driver is prompted that a collision risk may occur in the direction of the nearby vehicle. In this way, when the vehicle is moving, a safety risk caused by a possible collision accident between a vehicle near the ego-vehicle and another vehicle to moving of the ego-vehicle is identified in advance, and the ego-vehicle is warned, so that the driver can perform prevention or avoidance in advance, thereby improving a safety warning capability of the vehicle and improving driving safety of the vehicle driven by a user.

In a possible design, with reference to the first aspect, the moving information of the ego-vehicle includes a current moving speed v of the ego-vehicle, a heading of the ego-vehicle, and a yawing rate of the ego-vehicle; and the determining a nearby area of an ego-vehicle based on moving information of the ego-vehicle includes: determining the nearby area of the ego-vehicle based on a deceleration a of the ego-vehicle, a response time Δt of the driver, a safety distance A, the current moving speed v of the ego-vehicle, the heading of the ego-vehicle, and the yawing rate of the ego-vehicle.

Based on the possible design, the nearby area of the ego-vehicle can be determined based on a plurality of objective factors such as the response time of the driver, the current vehicle speed, and the deceleration in vehicle braking, so that the nearby area and a non-nearby area of the ego-vehicle are classified more properly. This ensures that after a collision risk between a vehicle in the nearby area of the ego-vehicle and another vehicle is detected, the driver has a sufficient time to respond while considering a braking time to avoid the risk.

In a possible design, with reference to the first aspect or any possible design of the first aspect, the deceleration a of the ego-vehicle, the response time $\Delta t$ of the driver, and the safety distance A are preset based on experience or adjusted by a user based on a requirement. Based on the possible design, a parameter for determining the nearby area of the ego-vehicle may be set at discretion based on the individual response time of the driver and a deceleration time in vehicle braking. In this way, the user can perform an adjustment based on an appropriate driving level capability of the user, to obtain a more accurate warning prompt effect that is more suitable for the user and improve user experience.

In a possible design, with reference to the first aspect or any possible design of the first aspect, the performing target classification on vehicles surrounding the ego-vehicle to obtain nearby vehicles in a plurality of directions and remote vehicle sets in the plurality of directions includes: obtaining moving information of the vehicles surrounding the ego-vehicle; determining, based on the moving information of the vehicles surrounding the ego-vehicle and a vehicle kinematics algorithm, vehicle sets that are in the plurality of directions and associated with the ego-vehicle among the vehicles surrounding the ego-vehicle; and determining a vehicle that is in the vehicle set and is located in the nearby area of the ego-vehicle and closest to the ego-vehicle as a nearby vehicle, and determining a vehicle that is in the vehicle set and is located outside the nearby area as a remote vehicle in the remote vehicle set.

The vehicle kinematics algorithm may be a target classification algorithm. Based on the possible design, the vehicle kinematics algorithm can be used to classify the vehicles surrounding the ego-vehicle into two types: nearby vehicles and remote vehicles. This is simple and feasible.

In a possible design, with reference to the first aspect or any possible design of the first aspect, for a nearby vehicle in any direction that matches the direction of the remote vehicle, calculating a shortest distance between the nearby vehicle in the direction and the remote vehicle in a future time period includes: obtaining an analytic path prediction expression of the nearby vehicle based on a path prediction algorithm and moving information of the nearby vehicle, where the analytic path prediction expression of the nearby vehicle is a relation between a time and a moving position of the nearby vehicle; obtaining an analytic path prediction expression of the remote vehicle based on the path prediction algorithm and moving information of the remote vehicle, where the analytic path prediction expression of the remote vehicle is a relation between a time and a moving position of the remote vehicle; and calculating the shortest distance between the nearby vehicle and the remote vehicle in the future time period based on the analytic path prediction expression of the nearby vehicle and the analytic path prediction expression of the remote vehicle.

Based on the possible design, each remote vehicle can be traversed based on the path prediction algorithm, and the shortest distance between the remote vehicle and the nearby vehicle in the direction matching that of the remote vehicle in the future time period can be calculated. This is simple and feasible.

In a possible design, with reference to the first aspect or any possible design of the first aspect, the sending alarm information to a driver of the ego-vehicle includes: sending the alarm information to the driver of the ego-vehicle by using an electronic control unit (ECU); or sending the alarm information to the driver of the ego-vehicle by using an indicator or by using an ECU and a user interface UI. Based on the possible design, the alarm information is sent to the driver in a form of sound or by turning on/off the indicator or by using a combination of the ECU and user interface displaying. This is easy and feasible.

According to a second aspect, this application provides a warning apparatus, where the warning apparatus may be a functional module included in a vehicle and capable of performing the ego-vehicle warning method provided in the embodiments of this application, or a chip or a system-on-chip in a vehicle. The warning apparatus can implement a function performed by the warning apparatus in the foregoing aspect or each possible design. The function may be implemented by hardware, or may be implemented by hardware executing corresponding software. The hardware or the software includes one or more modules corresponding to the foregoing function. For example, the warning apparatus may include a processing unit and a sending unit.

The processing unit is configured to: determine a nearby area of an ego-vehicle based on moving information of the ego-vehicle; perform target classification on vehicles surrounding the ego-vehicle to obtain nearby vehicles in a plurality of directions and remote vehicle sets in the plurality of directions, where a nearby vehicle in each direction is a vehicle closest to the ego-vehicle in the nearby area in the direction, and a remote vehicle set in each direction includes a remote vehicle located outside the nearby area in the direction; and for any remote vehicle, calculate a shortest distance between the remote vehicle and a nearby vehicle in each direction that matches a direction of the remote vehicle in the plurality of directions in a future time period, and record, in a memory, a time T when the shortest distance is less than a threshold D.

The sending unit is configured to send alarm information to a driver of the ego-vehicle based on a nearby vehicle corresponding to an earliest time T among all recorded times T, where the alarm information is used to indicate to the driver that an accidental collision accident not caused by the ego-vehicle or another accidental collision accident may occur in a direction of the nearby vehicle corresponding to the earliest time T.

Based on the warning apparatus according to the second aspect, the warning apparatus may determine, based on the nearby area of the ego-vehicle, nearby vehicles surrounding the ego-vehicle and associated with the ego-vehicle and a remote vehicle set including at least one remote vehicle, predict a time T at which each remote vehicle may collide with a nearby vehicle in a direction matching that of the remote vehicle, use a nearby vehicle corresponding to an earliest time T as a most threatening vehicle for the ego-vehicle, and prompt the driver that a collision risk may occur in the direction of the nearby vehicle. In this way, when the vehicle is moving, a safety risk caused by a possible collision accident between a vehicle near the ego-vehicle and another vehicle to moving of the ego-vehicle is identified in advance, and the ego-vehicle is warned, so that the driver can perform prevention or avoidance in advance, thereby improving a safety warning capability of the vehicle and improving driving safety of the vehicle driven by a user.

In a possible design, with reference to the second aspect, the warning apparatus further includes a receiving unit, configured to obtain the moving information of the ego-vehicle from a GNSS, where the moving information of the ego-vehicle includes a current moving speed v of the ego-vehicle, a heading of the ego-vehicle, and a yawing rate of the ego-vehicle; and the processing unit is specifically configured to determine the nearby area of the ego-vehicle based on a deceleration a of the ego-vehicle, a response time $\Delta t$ of the driver, a safety distance A, the current moving speed v of the ego-vehicle, the heading of the ego-vehicle, and the yawing rate of the ego-vehicle.

Based on the possible design, the nearby area of the ego-vehicle can be determined based on a plurality of objective factors such as the response time of the driver, the current vehicle speed, and the deceleration in vehicle braking, so that the nearby area and a non-nearby area of the ego-vehicle are classified more properly. This ensures that after a collision risk between a vehicle in the nearby area of the ego-vehicle and another vehicle is detected, the driver has a sufficient time to respond while considering a braking time to avoid the risk.

In a possible design, with reference to the second aspect or any possible design of the second aspect, the deceleration a of the ego-vehicle, the response time $\Delta t$ of the driver, and the safety distance A are preset based on experience or adjusted by a user based on a requirement. Based on the possible design, a parameter for determining the nearby area of the ego-vehicle may be set at discretion based on the individual response time of the driver and a deceleration time in vehicle braking. In this way, the user can perform an adjustment based on an appropriate driving capability of the user, to obtain a more accurate warning prompt effect that is more suitable for the user and improve user experience.

In a possible design, with reference to the second aspect or any possible design of the second aspect, the warning apparatus further includes a receiving unit, where the receiving unit is configured to obtain moving information of the vehicles surrounding the ego-vehicle; and the processing unit is specifically configured to determine vehicle sets in the plurality of directions based on the moving information that is of the vehicles surrounding the ego-vehicle and is obtained by the receiving unit and a vehicle kinematics algorithm, where a vehicle set in each of the plurality of directions includes a vehicle that is located in the direction and associated with the ego-vehicle among the vehicles surrounding the ego-vehicle; and determine a vehicle that is in the vehicle set and is located in the nearby area of the ego-vehicle and closest to the ego-vehicle as a nearby vehicle, and determine a vehicle that is in the vehicle set and is located outside the nearby area as a remote vehicle in the remote vehicle set.

Based on the possible design, the vehicle kinematics algorithm can be used to classify the vehicles surrounding the ego-vehicle into two types: nearby vehicles and remote vehicles. This is simple and feasible.

In a possible design, with reference to the second aspect or any possible design of the second aspect, the processing unit is specifically configured to: for a nearby vehicle in any direction that matches the direction of the remote vehicle, obtain an analytic path prediction expression of the nearby vehicle based on a path prediction algorithm and moving information of the nearby vehicle, where the analytic path prediction expression of the nearby vehicle is a relation between a time and a moving position of the nearby vehicle; obtain an analytic path prediction expression of the remote vehicle based on the path prediction algorithm and moving information of the remote vehicle, where the analytic path prediction expression of the remote vehicle is a relation between a time and a moving position of the remote vehicle; and calculate the shortest distance between the nearby vehicle and the remote vehicle in the future time period based on the analytic path prediction expression of the nearby vehicle and the analytic path prediction expression of the remote vehicle.

Based on the possible design, each remote vehicle can be traversed based on the path prediction algorithm, and the shortest distance between the remote vehicle and the nearby vehicle in the direction matching that of the remote vehicle in the future time period can be calculated. This is simple and feasible.

In a possible design, with reference to the second aspect or any possible design of the second aspect, the sending unit is specifically configured to send the alarm information to the driver of the ego-vehicle by using an audio electronic control unit (ECU); or send the alarm information to the driver of the ego-vehicle by using an indicator or by using an ECU and a user interface UI. Based on the possible design, the alarm information may be sent to the driver in a form of sound or by turning on/off the indicator or by using a combination of the ECU and user interface displaying. This is easy and feasible.

According to a third aspect, this application provides a warning apparatus, including an MCU, a CAN processor, and a memory, where the MCU is configured to determine a nearby area of an ego-vehicle based on moving information of the ego-vehicle; perform target classification on vehicles surrounding the ego-vehicle to obtain nearby vehicles in a plurality of directions and remote vehicle sets in the plurality of directions, where a nearby vehicle in each direction is a vehicle closest to the ego-vehicle in the nearby area in the direction, and a remote vehicle set in each direction includes a remote vehicle located outside the nearby area in the direction; and for any remote vehicle, calculate a shortest distance between the remote vehicle and a nearby vehicle in each direction that matches a direction of the remote vehicle in the plurality of directions in a future time period, and record, in the memory, a time T when the shortest distance is less than a threshold D; and the CAN processor is configured to send alarm information to a driver of the ego-vehicle based on a nearby vehicle corresponding to an earliest time T among all recorded times T, where the alarm information is used to indicate to the driver that an accidental collision accident not caused by the ego-vehicle or another accidental collision accident may occur in a direction of the nearby vehicle corresponding to the earliest time T.

Based on the warning apparatus according to the third aspect, the warning apparatus may determine, based on the nearby area of the ego-vehicle, nearby vehicles surrounding the ego-vehicle and associated with the ego-vehicle and a remote vehicle set including at least one remote vehicle, predict a time T at which each remote vehicle may collide with a nearby vehicle in a direction matching that of the remote vehicle, use a nearby vehicle corresponding to an earliest time T as a most threatening vehicle for the ego-vehicle, and prompt the driver that a collision risk may occur in the direction of the nearby vehicle. In this way, when the vehicle is moving, a safety risk caused by a possible collision accident between a vehicle near the ego-vehicle and another vehicle to moving of the ego-vehicle is identified in advance, and the ego-vehicle is warned, so that the driver can perform prevention or avoidance in advance, thereby improving a safety warning capability of the vehicle and improving driving safety of the vehicle driven by a user.

In a possible design, with reference to the third aspect, the warning apparatus further includes a global navigation satellite system GNSS receiver, where the GNSS receiver is configured to obtain the moving information of the ego-vehicle from a GNSS, where the moving information of the ego-vehicle includes a current moving speed v of the ego-vehicle, a heading of the ego-vehicle, and a yawing rate of the ego-vehicle; and the MCU is specifically configured to determine the nearby area of the ego-vehicle based on a deceleration a of the ego-vehicle, a response time Δt of the driver, a safety distance A, the current moving speed v of the ego-vehicle, the heading of the ego-vehicle, and the yawing rate of the ego-vehicle. Based on the possible design, the nearby area of the ego-vehicle can be determined based on a plurality of objective factors such as the response time of the driver, the current vehicle speed, and the deceleration in vehicle braking, so that the nearby area and a non-nearby area of the ego-vehicle are classified more properly. This ensures that after a collision risk between a vehicle in the nearby area of the ego-vehicle and another vehicle is detected, the driver has a sufficient time to respond while considering a braking time to avoid the risk.

In a possible design, with reference to the third aspect or any possible design of the third aspect, the deceleration a of the ego-vehicle, the response time Δt of the driver, and the safety distance A are preset based on experience or adjusted by a user based on a requirement. Based on the possible design, a parameter for determining the nearby area of the ego-vehicle may be set at discretion based on the individual response time of the driver and a deceleration time in vehicle braking. In this way, the user can perform an adjustment based on an appropriate driving capability of the user, to obtain a more accurate warning prompt effect that is more suitable for the user and improve user experience.

In a possible design, with reference to the third aspect or any possible design of the third aspect, the warning apparatus further includes a vehicle-to-everything V2X radio transceiver, where the V2X radio transceiver is configured to obtain moving information of the vehicles surrounding the ego-vehicle; and the MCU is specifically configured to determine vehicle sets in the plurality of directions based on the moving information that is of the vehicles surrounding the ego-vehicle and is obtained by a V2X radio transceiver and a vehicle kinematics algorithm, where a vehicle set in each of the plurality of directions includes a vehicle that is located in the direction and associated with the ego-vehicle among the vehicles surrounding the ego-vehicle; and determine a vehicle that is in the vehicle set and is located in the nearby area of the ego-vehicle and closest to the ego-vehicle as a nearby vehicle, and determine a vehicle that is in the vehicle set and is located outside the nearby area as a remote vehicle in the remote vehicle set. Based on the possible design, the vehicle kinematics algorithm can be used to classify the vehicles surrounding the ego-vehicle into two types: nearby vehicles and remote vehicles. This is simple and feasible.

In a possible design, with reference to the third aspect or any possible design of the third aspect, the MCU is specifically configured to: for a nearby vehicle in any direction that matches the direction of the remote vehicle, obtain an analytic path prediction expression of the nearby vehicle based on a path prediction algorithm and moving information of the nearby vehicle, where the analytic path prediction expression of the nearby vehicle is a relation between a time and a moving position of the nearby vehicle; obtain an analytic path prediction expression of the remote vehicle based on the path prediction algorithm and moving information of the remote vehicle, where the analytic path prediction expression of the remote vehicle is a relation between a time and a moving position of the remote vehicle; and calculate the shortest distance between the nearby vehicle and the remote vehicle in the future time period based on the analytic path prediction expression of the nearby vehicle and the analytic path prediction expression of the remote vehicle. Based on the possible design, each remote vehicle can be traversed based on the path prediction algorithm, and the shortest distance between the remote vehicle and the nearby vehicle in the direction matching that of the remote vehicle in the future time period can be calculated. This is simple and feasible.

In a possible design, with reference to the third aspect or any possible design of the third aspect, the processor is specifically configured to: send the alarm information to the driver of the ego-vehicle by using an ECU; or send the alarm information to the driver of the ego-vehicle by using an indicator or by using an ECU and a user interface UI. Based on the possible design, the alarm information may be sent to the driver in a form of sound or by turning on/off the indicator or by using a combination of the ECU and user interface displaying. This is easy and feasible.

According to a fourth aspect, a computer-readable storage medium is provided, where the computer-readable storage medium stores instructions, and when the instructions are run on a computer, the computer is enabled to perform the ego-vehicle warning method according to the first aspect or any possible design of the first aspect.

According to a fifth aspect, a computer program product including instructions is provided, where when the computer program product runs on a computer, the computer is enabled to perform the ego-vehicle warning method in the first aspect or any possible design of the first aspect.

According to a sixth aspect, a system-on-chip is provided, where the system-on-chip includes a processor and a communications interface, and is configured to support a warning apparatus in implementing functions in the foregoing aspect. For example, the processor determines a nearby area of an ego-vehicle based on moving information of the ego-vehicle; performs target classification on vehicles surrounding the ego-vehicle to obtain nearby vehicles in a plurality of directions and remote vehicle sets in the plurality of directions, where a nearby vehicle in each direction is a vehicle closest to the ego-vehicle in the nearby area in the direction, and a remote vehicle set in each direction includes a remote vehicle located outside the nearby area in the direction; and for any remote vehicle, calculates a shortest distance between the remote vehicle and a nearby vehicle in each direction that matches a direction of the remote vehicle in the plurality of directions in a future time period, and records, in a memory, a time T when the shortest distance is less than a threshold D; and sends, by using the communications interface, alarm information to a driver of the ego-vehicle based on a nearby vehicle corresponding to an earliest time T among all recorded times T, where the alarm information is used to indicate to the driver that an accidental collision accident not caused by the ego-vehicle or another accidental collision accident may occur in a direction of the nearby vehicle corresponding to the earliest time T. In a possible design, the system-on-chip further includes the memory, where the memory is configured to store program instructions and data required by the warning apparatus. The system-on-chip may include a chip, or may include a chip and another discrete device.

For a technical effect achieved in any design mode of the third aspect to the sixth aspect, refer to the technical effect achieved in any one of the first aspect or the possible designs of the first aspect. Details are not described again.

According to a seventh aspect, an embodiment of this application further provides a vehicle, where the vehicle may include the warning apparatus according to any one of the second aspect to the sixth aspect.

DESCRIPTION OF EMBODIMENTS

The following describes implementations of the embodiments of this application in detail with reference to accompanying drawings of this specification.

Figure 1:
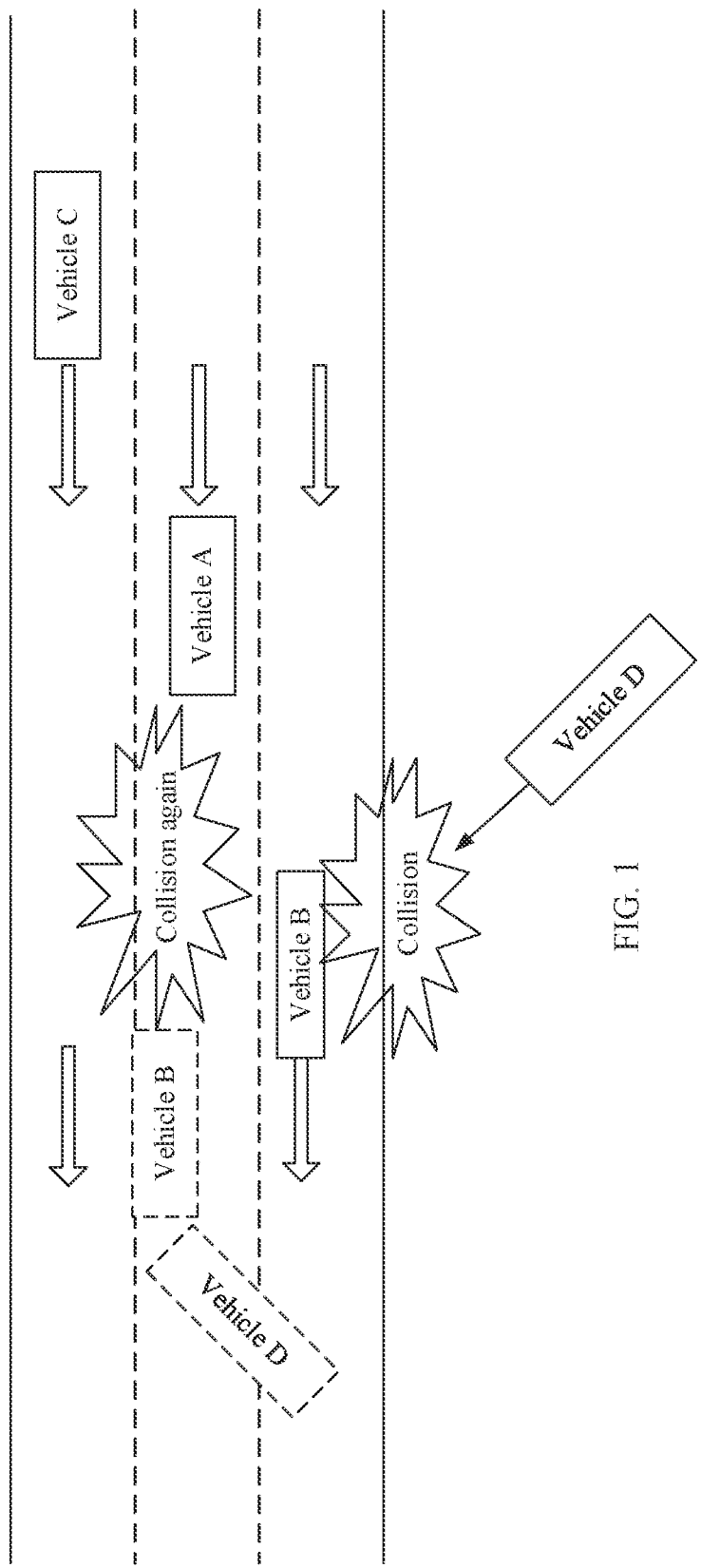
FIG. 1 is a simplified schematic diagram of a driving safety warning scenario according to an embodiment of this application.

A method provided in an embodiment of this application may be applied to a driving safety warning scenario shown in FIG. 1. As shown in FIG. 1, the driving safety warning scenario may include a plurality of vehicles. Vehicles may communicate with each other based on a long term evolution communications technology used for vehicles (long term evolution-vehicle, LTE-V), or may communicate with each other based on dedicated short range communication (dedicated short range communication, DSRC) using an 802.11p access layer protocol. This is not limited.

A vehicle in FIG. 1 may communicate with a roadside unit (roadside unit, RSU) or another network device (for example, a V2X server) by using a radio link. The vehicle may be an intelligent network driving (intelligent network driving) vehicle, and is a typical Internet of Vehicles terminal. A person skilled in the art should understand that the vehicle may specifically perform an ego-vehicle warning method according to an embodiment of this application by using a functional unit or an apparatus in the vehicle. For example, the vehicle may include a warning apparatus 101 configured to perform the ego-vehicle warning method provided in this embodiment of this application. The warning apparatus 101 may be communicatively connected to other components of the vehicle by using a controller area network (controller area network, CAN) bus. A specific structure of the vehicle is described in detail in the embodiment shown in FIG. 2a.

In the scenario shown in FIG. 1, a vehicle A moves on a road surface, the vehicle A is further surrounded by a vehicle B and a vehicle C, and the vehicle A, the vehicle B, and the vehicle C move in a same direction on respective lanes. In this case, a vehicle (vehicle D) moves toward the vehicle B from one side. By using an existing ego-vehicle warning method, the vehicle A calculates a possibility that the vehicle D will not collide with the vehicle A in a future time period. Therefore, the vehicle A is not warned. However, an actual situation is that the vehicle D may collide with the vehicle B in the future time period. If the vehicle D really collides with the vehicle B, after the collision, a speed and position of the vehicle B or the vehicle D instantaneously change rapidly. The position of the vehicle B or the vehicle D deviates after the collision, and may be very close to the vehicle A (relative to a speed of the vehicle A). In this case, a response time that can be left for a driver of the vehicle A may not be sufficient to avoid the vehicle B or the vehicle D after the collision. Consequently, the vehicle A will also collide with the vehicle B or the vehicle D.

When the vehicle A moves, a collision accident that may occur between a surrounding vehicle and another vehicle causes a safety risk to moving of the vehicle A. To resolve this problem, the vehicle A may identify, in advance by using the ego-vehicle warning method provided in this embodiment of this application, that the vehicle B or the vehicle D will collide with the vehicle A after the vehicle D collides with the vehicle B, and the vehicle A is warned, so that the driver of the vehicle A performs prevention or avoidance in advance, to improve driving safety of the vehicle driven by the user.

The ego-vehicle warning method provided in this embodiment of this application is: obtaining a vehicle in a surrounding nearby area in which the ego-vehicle moves, and calculating a collision risk between the vehicle in the nearby area of the ego-vehicle and another vehicle; and if a collision between the vehicle in the nearby area of the ego-vehicle and the another vehicle causes a collision risk to the ego-vehicle, warning the ego-vehicle, so that the ego-vehicle knows in advance the collision risk caused to the another vehicle by the vehicle in the nearby area of the ego-vehicle other than a factor of the ego-vehicle and notes a series of possible accidents in advance and can avoid the accidents (for example, decelerate in advance) in advance. Specifically, for the detailed description of the ego-vehicle warning method, refer to the following description in the embodiment corresponding to FIG. 3.

It should be noted that FIG. 1 is merely an example scenario diagram. A quantity of vehicles shown in FIG. 1 is not limited in this embodiment of this application. Moreover, in addition to the devices shown in FIG. 1, the scenario in FIG. 1 may further include other devices. For example, the driving safety warning scenario may further include a roadside unit (roadside unit, RSU), and the like. The RSU is deployed on a roadside. The RSU is mainly configured to collect moving information of a vehicle, and send the collected information to the vehicle. The vehicle and the RSU may communicate with each other by using a radio link. In addition, names of the devices in FIG. 1 are not limited. In addition to the names shown in FIG. 1, the devices may also have other names. For example, the names are replaced with names of network elements having same or similar functions. This is not limited.

Figure 2A:
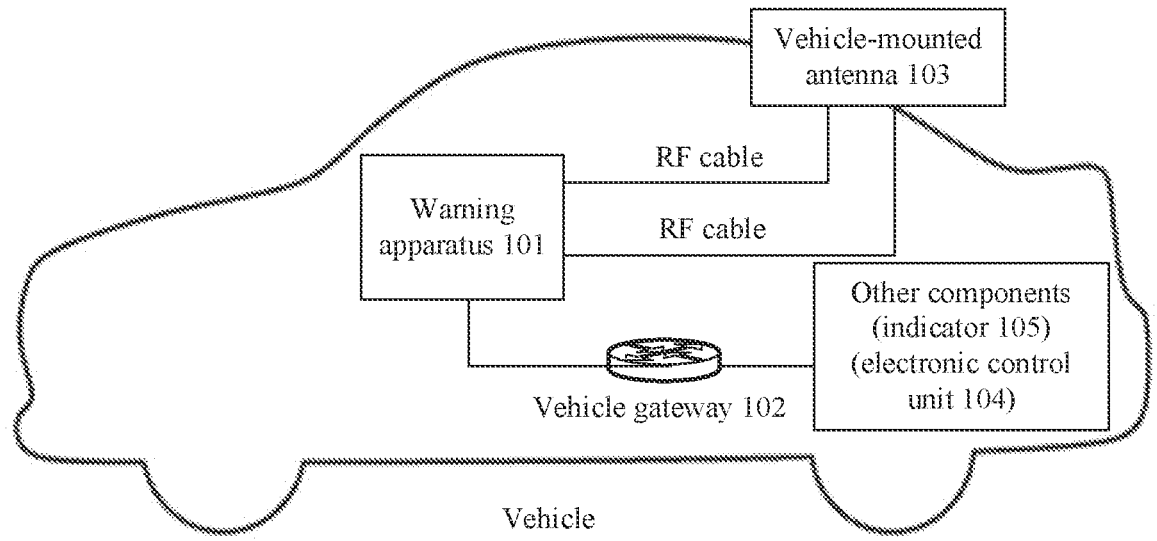
FIG. 2a is a schematic diagram of composition of a vehicle according to an embodiment of this application.

FIG. 2a is a schematic diagram of a structure of a vehicle according to an embodiment of this application. As shown in FIG. 2a, the vehicle may include a warning apparatus 101, a vehicle gateway 102, and a vehicle-mounted antenna 103. Further, the vehicle may further include an electronic control unit (electronic control unit, ECU) 104, an indicator 105, or the like. Components included in the vehicle may be connected to each other by using a CAN bus.

It may be understood that the structure shown in FIG. 2a does not constitute a specific limitation on the vehicle. In some other embodiments, the vehicle may include more or fewer components than those shown in the figure, or combine some components, or split some components, or have different component arrangements. For example, the vehicle may further include a telematics box (telematics box, T-box), a domain controller (domain controller, DC), a multi-domain controller (multi-domain controller, MDC), a user interface (for example, a touch display screen), or the like. The components shown in FIG. 2a may be implemented by using hardware, software, or a combination of software and hardware, for example, an Internet of Vehicles chip. A specific structure of the warning apparatus 101 is described in detail in the embodiment shown in FIG. 2ab.

The warning apparatus 101 may be configured to perform the ego-vehicle warning method provided in this embodiment of this application. The specific structure of the warning apparatus 101 is described in detail in the embodiment shown in FIG. 2b.

The vehicle gateway 102 is mainly configured to receive and send vehicle information. The vehicle gateway 41 may be connected to the warning apparatus 101 by using a CAN bus connection. For example, the vehicle gateway 41 may receive alarm information from the warning apparatus 101, send the alarm information to the ECU 104 or the indicator 105, and send an alarm prompt to a driver by using the ECU 104 or the indicator 105.

The vehicle-mounted antenna 103 may include a V2X communications antenna and a GNSS communications antenna. The V2X communications antenna is responsible for radio signal transmission and reception such as V2X communication. The GNSS communications antenna is responsible for receiving positioning data sent by a GNSS.

The ECU 104 may be configured to externally play back information in a form of sound, or receive an instruction sent by a user, or the like.

The indicator 105 may have a plurality of colors. Different information content may be conveyed to the driver by using different colors of the indicator 105.

Figure 2B:
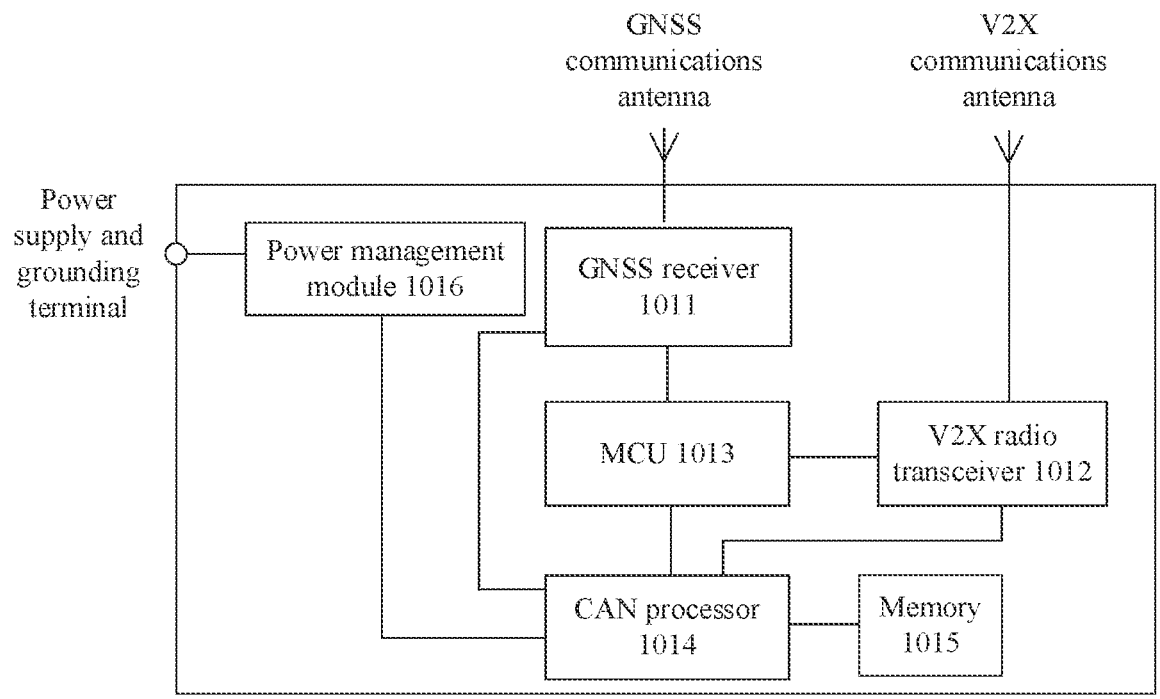
FIG. 2b is a schematic diagram of composition of a warning apparatus according to an embodiment of this application.

FIG. 2b is a schematic diagram of a structure of a warning apparatus 101 according to an embodiment of this application. As shown in FIG. 2b, the warning apparatus 101 may include a global navigation satellite system (global navigation satellite system, GNSS) receiver 1011, a V2X radio transceiver (modem) 1012, a micro control unit (micro control unit, MCU) 1013, and a CAN processor 1014. Further, the warning apparatus 101 may further include a memory 1015 and a power management module 1016.

It may be understood that the structure shown in FIG. 2b does not constitute a specific limitation on the warning apparatus. In some other embodiments, the warning apparatus may include more or fewer components than those shown in the figure, or combine some components, or split some components, or have different component arrangements. The components shown in the figure may be implemented by using hardware, software, or a combination of software and hardware.

The GNSS receiver 1011 is responsible for receiving a GNSS signal. The GNSS receiver 1011 may provide a wireless communications solution applied to the warning apparatus 101 and including a GNSS or the like. The GNSS receiver 1011 may be one or more devices integrating at least one communications processing module. The GNSS receiver 1011 receives an electromagnetic wave by using the GNSS communications antenna, performs frequency modulation and filtering processing on the electromagnetic wave signal, and sends the processed signal to the MCU 1013. The GNSS may include a global satellite positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS), or the like. This is not limited.

The V2X radio transceiver 1012 is responsible for transmitting and receiving V2X information. The V2X radio transceiver 1012 may provide a wireless communications solution applied to the warning apparatus 101 and including V2X or the like. The V2X radio transceiver 1012 may include at least one filter, a switch, a power amplifier, a low noise amplifier (low noise amplifier, LNA), or the like. The V2X radio transceiver 1012 may receive an electromagnetic wave by using the V2X communications antenna, perform processing such as filtering and amplification on the received electromagnetic wave, and send the processed signal to the MCU 1013. The V2X radio transceiver 1012 may further amplify a signal modulated by a modem processor. The V2X radio transceiver 1012 may further receive a to-be-sent signal from the CAN processor 1014, perform frequency modulation and amplification on the signal, convert the signal into an electromagnetic wave by using the V2X communications antenna, and radiate the electromagnetic wave.

In some embodiments, the GNSS receiver 1011 and the GNSS communications antenna are coupled, and the V2X radio transceiver 1012 and the V2X communications antenna are coupled, so that the warning apparatus 101 communicates with a network and another device by using a GNSS satellite communications technology and a V2X communications technology.

The MCU 1013 is responsible for performing, based on the positioning data obtained from the GNSS receiver 1011 and position information that is of a vehicle surrounding the ego-vehicle and that is obtained from the V2X radio transceiver 1012, the ego-vehicle warning method provided in this embodiment of this application.

The CAN processor 1014 receives vehicle information data, including a vehicle alarm, a start signal, a brake signal, a turn signal, an accelerator signal, and the like. The CAN processor 1014 may include one or more processing units. For example, the CAN processor 1014 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The CAN processor 1014 may be a nerve center and a command center of the warning apparatus. The controller may generate an operation control signal based on instruction operation code and a time sequence signal, to complete control of instruction reading and instruction execution.

The CAN processor 1014 may be further provided with a memory, configured to store instructions and data. In some embodiments, the memory in the CAN processor 1014 is a cache memory. The memory may store instructions or data just used or cyclically used by the CAN processor 1014.

The memory 1015 may be configured to store computer executable program code, and the executable program code includes instructions. By running the instructions stored in the memory 1015 and invoking data stored in the memory 1015, the CAN processor 1014 may perform various function applications and data processing of the warning apparatus 101. For example, in this embodiment, the CAN processor 1014 may send alarm information to the driver based on a time T stored in the memory 1015, where the time T is a time when a shortest distance between a remote vehicle and a nearby vehicle is less than a threshold.

In some embodiments, the memory 1015 may include a data storage area and a program storage area. The data storage area is configured to store corresponding data. In addition, the memory 1015 may include a high-speed random access memory, and may further include a non-volatile memory, for example, at least one magnetic storage device, a flash (flash) memory device, a UFS, or an eMMC.

The power management module 1016 is connected to the CAN processor 1014, and connected to a power supply by using a power supply and grounding terminal. The power management module 1016 receives a power input, and supplies power to the CAN processor 1014 or the like.

In some embodiments of this application, the V2X radio transceiver 1012, the MCU 1013, and the CAN processor 1014 may be integrated in a chip module (or referred to as a system-on-chip).

In the embodiments of this application, the chip system may include a chip, or may include a chip and another discrete component.

In addition, actions, terms, and the like in the embodiments of this application may be mutually referenced. This is not limited. A message name or a parameter name in a message in this embodiment of this application is merely an example. In a specific implementation, another name may also be used. This is not limited.

With reference to the system shown in FIG. 1, the following describes an ego-vehicle warning method provided in an embodiment of this application. A vehicle described in the following embodiment may have the components shown in FIG. 2a, and a warning apparatus described in the following embodiment may have the components shown in FIG. 2b.

Figure 3:
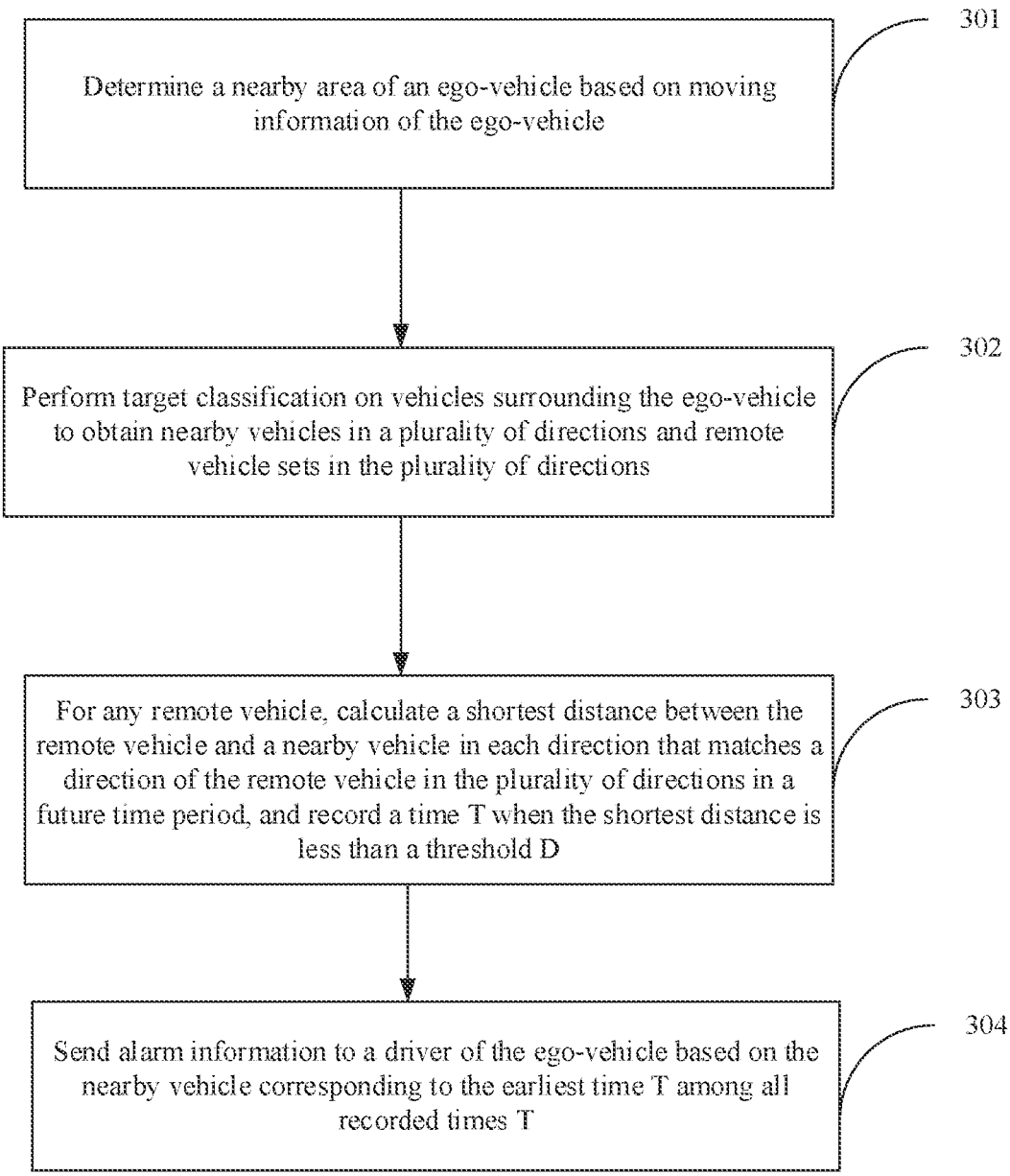
FIG. 3 is a flowchart of an ego-vehicle warning method according to an embodiment of this application.

FIG. 3 is an ego-vehicle warning method according to an embodiment of this application. The ego-vehicle warning method is performed by a warning apparatus. The warning apparatus may have the components shown in FIG. 2. As shown in FIG. 3, the method may include the following steps.

Step 301: Determine a nearby area of an ego-vehicle based on moving information of the ego-vehicle.

The ego-vehicle may be any vehicle in the scenario shown in FIG. 1.

The moving information of the ego-vehicle includes a current moving speed v of the ego-vehicle, a heading of the ego-vehicle, and a yawing rate of the ego-vehicle. The warning apparatus may obtain the moving information of the ego-vehicle from a GNSS by using a GNSS receiver.

The nearby area of the ego-vehicle may be an elliptical area. The nearby area of the ego-vehicle may be formed by a set of position points whose distances to the ego-vehicle (or a center of the ego-vehicle) are less than a preset threshold. An area other than the nearby area may be referred to as a non-nearby area of the ego-vehicle. The preset threshold may be set based on a requirement. When a distance from a position point to the ego-vehicle is less than the preset threshold, it indicates that the position point is relatively close to the ego-vehicle, and may be referred to as a nearby point of the ego-vehicle.

For example, the determining a nearby area of an ego-vehicle based on moving information of the ego-vehicle may include: determining the nearby area of the ego-vehicle based on a deceleration a of the ego-vehicle, a response time Δt of a driver, a safety distance A, the current moving speed v of the ego-vehicle, the heading of the ego-vehicle, and the yawing rate of the ego-vehicle. Specifically, the nearby area Y of the ego-vehicle may be determined based on the following formula (1):

$$Y = \cos(\theta)\left(v \times \Delta t + v \times t + \frac{at^2}{2}\right) + A \qquad \text{formula (1)}$$

where Y is a distance from an edge point of the nearby area of the ego-vehicle to the ego-vehicle (or a center point of the ego-vehicle); a indicates the deceleration when the driver of the ego-vehicle realizes that the deceleration is needed, and a may be a preset fixed value (for example, −3.6 m/S^2); Δt indicates the response time of the driver of the ego-vehicle, and Δt may be a fixed value (for example, 3 seconds); t is the time for the driver of the ego-vehicle to decelerate from the current moving speed v of the ego-vehicle to 0 when the driver of the ego-vehicle realizes that the deceleration is needed, and t is expressed as t=v/a; a indicates a safety distance between vehicles (or referred to as a stationary safety distance), and a may be a fixed value (for example, 1 meter); and θ is a yawing angle of the edge point of the nearby area of the ego-vehicle relative to a due north direction of the ego-vehicle. The warning apparatus may obtain the moving speed, position information, heading information, and the like of the ego-vehicle by using the prior art, and determine the yawing angle θ based on the obtained information.

Figure 4:
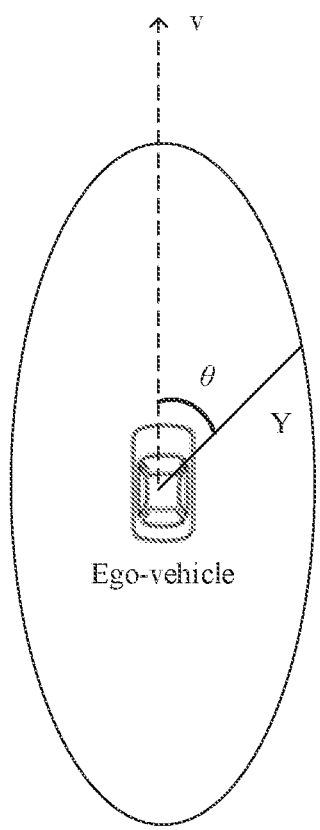
FIG. 4 is a schematic diagram of a nearby area of an ego-vehicle according to an embodiment of this application.

For example, FIG. 4 shows the nearby area of the ego-vehicle. The nearby area of the ego-vehicle increases when the moving speed v of the ego-vehicle increases, and decreases when the moving speed v of the ego-vehicle decreases.

The deceleration a of the ego-vehicle, the response time Δt of the driver, and the safety distance A are preset based on experience or adjusted by a user based on a requirement.

Step 302: Perform target classification on vehicles surrounding the ego-vehicle to obtain nearby vehicles in a plurality of directions and remote vehicle sets in the plurality of directions.

The plurality of directions may be eight directions relative to the ego-vehicle, for example, may include a front side of the ego-vehicle, a front left side of the ego-vehicle, a front right side of the ego-vehicle, a left side of the ego-vehicle, a right side of the ego-vehicle, a rear side of the ego-vehicle, a rear left side of the ego-vehicle, and a rear right side of the ego-vehicle.

Figure 5:
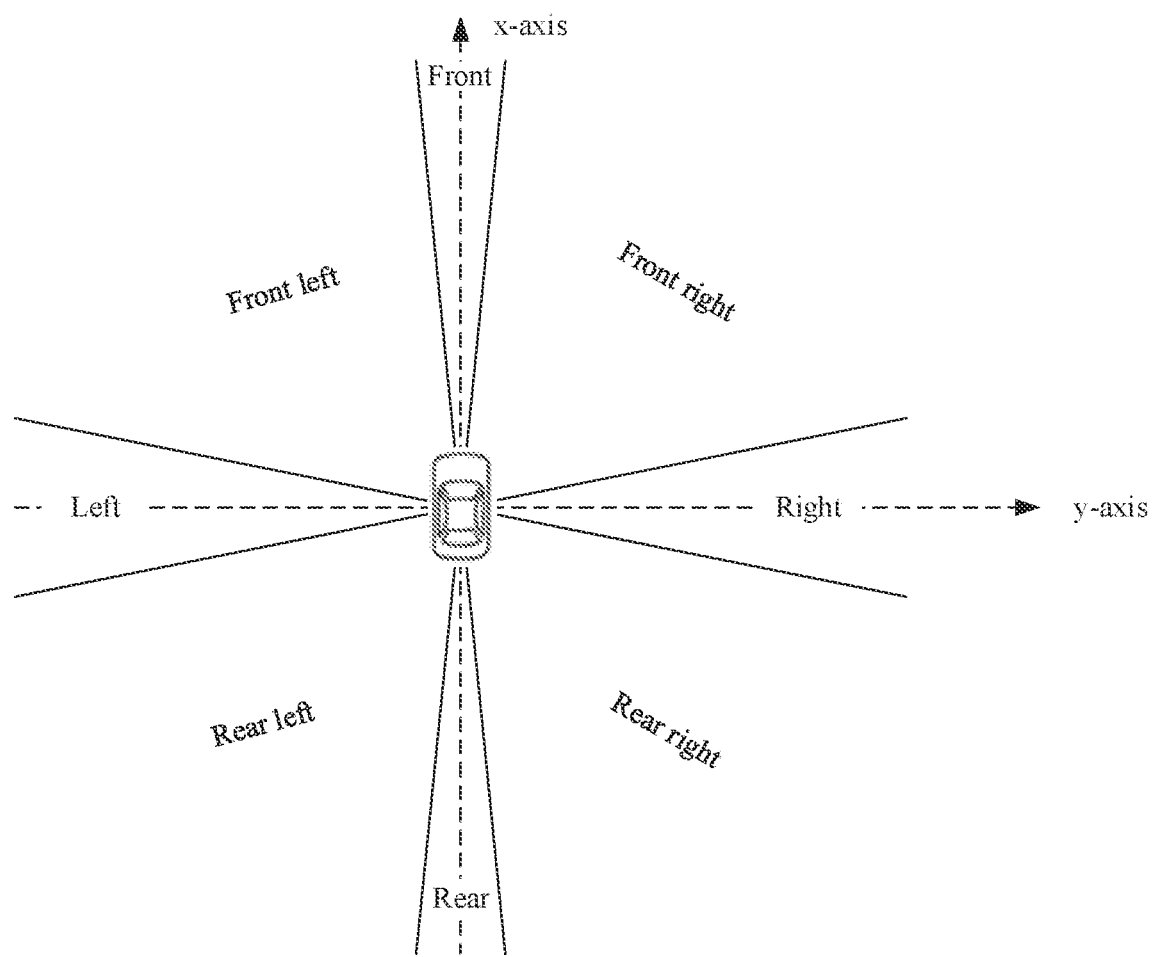
FIG. 5 is a schematic diagram of a plurality of directions relative to an ego-vehicle according to an embodiment of this application.

As shown in FIG. 5, a horizontal coordinate system is established by using the ego-vehicle as a center. A moving direction of the ego-vehicle is an x-axis. The x-axis points to the moving direction of the ego-vehicle. A y-axis is perpendicular to the x-axis and points to a right side of the ego-vehicle. The front side of the ego-vehicle may be an area within a range of [−5 degrees, +5 degrees). The front right side of the ego-vehicle may be an area within a range of [+5 degrees, 80 degrees). The right side of the ego-vehicle may be an area within a range of 180 degrees, 100 degrees). The rear right side of the ego-vehicle may be an area within a range of [100 degrees, 175 degrees). The rear side of the ego-vehicle may be an area within a range of 1175 degrees, 185 degrees). The rear left side of the ego-vehicle may be an area within a range of [185 degrees, 260 degrees). The left side of the ego-vehicle may be an area within a range of [260 degrees, 280 degrees). The front left side of the ego-vehicle may be an area within a range of [280 degrees, 355 degrees).

A nearby vehicle in each direction is a vehicle closest to the ego-vehicle in the nearby area in the direction, or may be described as a vehicle that is located in the nearby area of the ego-vehicle in the direction and associated with the ego-vehicle during moving (having a potential collision risk with the ego-vehicle) and closest to the ego-vehicle. The nearby vehicle may also be defined as a nearby vehicle relative to the ego-vehicle. It may be understood that there is a maximum of one nearby vehicle in each direction only, and there may be no nearby vehicle (that is, no nearby vehicle exists).

A remote vehicle set in each direction includes a remote vehicle located outside the nearby area in the direction, or the remote vehicle may be described as a vehicle located in the non-nearby area of the ego-vehicle in the direction and associated with the ego-vehicle during moving (having a potential collision risk with the ego-vehicle). It may be understood that there may be a plurality of remote vehicles, that is, the remote vehicle may be one or more vehicles. Certainly, there may be no remote vehicle associated with the ego-vehicle in a direction. This is not limited.

For example, the performing target classification on vehicles surrounding the ego-vehicle to obtain nearby vehicles in a plurality of directions and remote vehicle sets in the plurality of directions may include:

after determining the nearby area of the ego-vehicle, obtaining, by the warning apparatus, information about the vehicles surrounding the ego-vehicle (for example, moving speeds, position information, and heading information of the vehicles); determining vehicle sets in the plurality of directions based on the moving information of the vehicles surrounding the ego-vehicle and a vehicle kinematics algorithm, where a vehicle set in each of the plurality of directions includes a vehicle that is located in the direction and associated with the ego-vehicle among the vehicles surrounding the ego-vehicle; and determining a vehicle that is in the vehicle set and is located in the nearby area of the ego-vehicle and closest to the ego-vehicle as a nearby vehicle, and determining a vehicle that is in the vehicle set and is located outside the nearby area as a remote vehicle in the remote vehicle set.

The warning apparatus may receive, through V2X communication, a basic safety message (basic safety message, BSM) packet sent by a vehicle surrounding the ego-vehicle, where the BSM packet carries an identity (identity, ID) of the surrounding vehicle, and a moving speed, position information, heading information, and the like of the surrounding vehicle. For example, the warning apparatus may receive, by using a V2X radio transceiver, a BSM packet sent by the surrounding vehicle, and parse the received BSM packet to obtain information such as the ID of the surrounding vehicle, and the moving speed, position information, and heading information of the surrounding vehicle. The surrounding vehicle may obtain the moving speed, position information, heading information, and the like of the surrounding vehicle by using the prior art. Details are not described herein again.

The vehicle kinematics algorithm may be any method for screening out the nearby vehicle and the remote vehicle relative to the ego-vehicle. There may be a plurality of algorithms for implementing this function. For example, the vehicle kinematics algorithm may be a target classification algorithm or another algorithm. In the description of this embodiment of this application, it is assumed that the vehicle kinematics algorithm is the target classification algorithm. For a specific implementation process of the target classification algorithm, refer to the following description in a first scenario of the method shown in FIG. 3.

Figure 6:
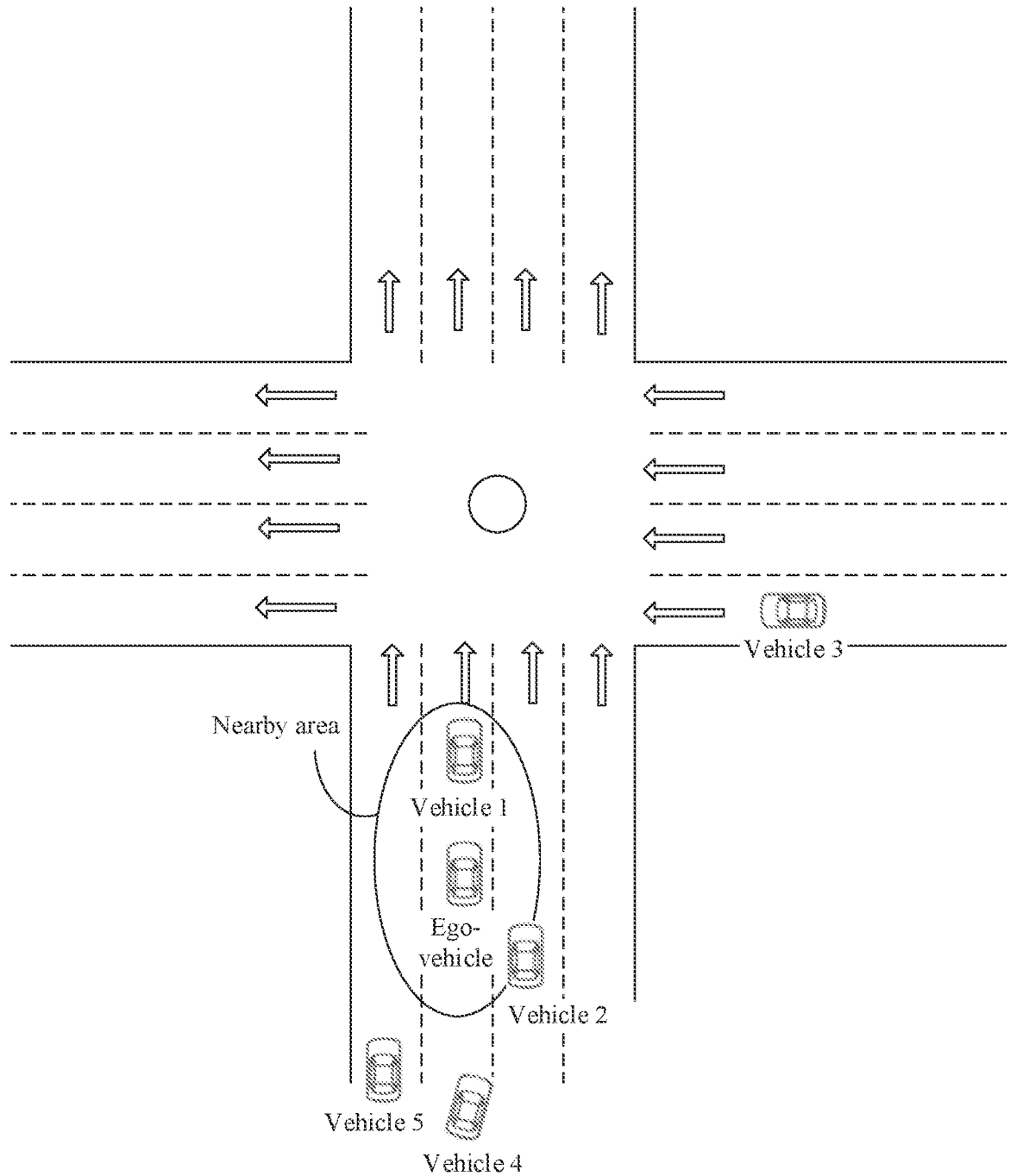
FIG. 6 is a schematic diagram of vehicle moving according to an embodiment of this application.

For example, as shown in FIG. 6, a vehicle 1 and a vehicle 2 are located in the nearby area of the ego-vehicle, and a vehicle 3, a vehicle 4, and a vehicle 5 are located in the non-nearby area of the ego-vehicle; if the vehicle 1 and the vehicle 2 are associated with the ego-vehicle, and the vehicle 1 is a vehicle that is located on the front side of the ego-vehicle and closest to the ego-vehicle, the vehicle 1 is a nearby vehicle on the front side; if the vehicle 2 is a vehicle that is located on the rear right side of the ego-vehicle and closest to the ego-vehicle, the vehicle 2 is a nearby vehicle on the rear right side; if the vehicle 3 and the vehicle 4 are associated with the ego-vehicle, the vehicle 3 is a remote vehicle on the front right side, and the vehicle 4 is a remote vehicle on the rear side of the ego-vehicle; if the vehicle 5 is not associated with the ego-vehicle, the vehicle is filtered out, and the vehicle 5 does not participate in subsequent path collision prediction calculation. Up to now, in FIG. 6, nearby vehicles associated with the ego-vehicle include {vehicle 1, vehicle 2}, and remote vehicles associated with the ego-vehicle include {vehicle 3, vehicle 4}.

Step 303: For any remote vehicle, calculate a shortest distance between the remote vehicle and a nearby vehicle in each direction that matches a direction of the remote vehicle in the plurality of directions in a future time period, and record a time T when the shortest distance is less than a threshold D.

The direction of the remote vehicle and the direction matching the direction of the remote vehicle satisfy a collision direction matching rule, and the collision direction matching rule may be preconfigured on the warning apparatus based on experience.

Assuming that the directions relative to the ego-vehicle are the eight directions, the collision direction matching rule may be shown in Table 1. If the remote vehicle is located on the rear side, directions matching the direction of the remote vehicle include five directions: the right side, the left side, the rear left side, the rear right side, and the rear side. If the remote vehicle is located on the rear left side, directions matching the direction of the remote vehicle include five directions: the front left side, the left side, the rear left side, the rear right side, and the rear side. If the remote vehicle is located on the front left side, directions matching the direction of the remote vehicle include five directions: the front side, the left side, the front right side, the rear left side, and the front left side. If the remote vehicle is located on the front right side, directions matching the direction of the remote vehicle include five directions: the front right side, the front side, the right side, the rear right side, and the front left side. If the remote vehicle is located on the front side, directions matching the direction of the remote vehicle include five directions: the front right side, the left side, the front left side, the right side, and the front side. If the remote vehicle is located on the left side, directions matching the direction of the remote vehicle include five directions: the front left side, the left side, the rear left side, the front side, and the rear side. If the remote vehicle is located on the right side, directions matching the direction of the remote vehicle include five directions: the right side, the front right side, the rear right side, the front side, and the rear side. If the remote vehicle is located on the rear right side, directions matching the direction of the remote vehicle include five directions: the right side, the rear left side, the rear side, the front right side, and the rear side.

TABLE 1

| Direction of the remote vehicle | Directions matching the direction of the remote vehicle |
|---|---|
| Rear side | Right side, left side, rear left side, rear right side, and rear side |
| Rear left side | Front left side, left side, rear left side, rear right side, and rear side |
| Front left side | Front side, left side, front right side, rear left side, and front left side |
| Front right side | Front right side, front side, right side, rear right side, and front left side |
| Front side | Front right side, left side, front left side, right side, and front side |
| Left side | Front left side, left side, rear left side, front side, and rear side |
| Right side | Right side, front right side, rear right side, front side, and rear side |
| Rear right side | Right side, rear left side, rear side, front right side, and rear side |

For example, for a nearby vehicle in any direction that matches the direction of the remote vehicle, calculating a shortest distance between the nearby vehicle in the direction and the remote vehicle in a future time period includes:

obtaining an analytic path prediction expression of the nearby vehicle based on a path prediction algorithm and moving information of the nearby vehicle, where the analytic path prediction expression of the nearby vehicle is a relation between a time and a moving position of the nearby vehicle;

obtaining an analytic path prediction expression of the remote vehicle based on the path prediction algorithm and moving information of the remote vehicle, where the analytic path prediction expression of the remote vehicle is a relation between a time and a moving position of the remote vehicle; and calculating the shortest distance between the nearby vehicle and the remote vehicle in the future time period based on the analytic path prediction expression of the nearby vehicle and the analytic path prediction expression of the remote vehicle.

By analogy, shortest distances between the remote vehicle and nearby vehicles in all directions matching the direction of the remote vehicle are calculated in the foregoing manner.

The moving information of the remote vehicle may include the current moving position of the remote vehicle, a moving speed v of the remote vehicle, a predicted curvature R of the remote vehicle, a heading a of the remote vehicle, and the like. The current moving position of the remote vehicle may be obtained by a GPS of the remote vehicle. The moving speed v of the remote vehicle is obtained by a speed sensor of the remote vehicle. The heading a of the remote vehicle may be obtained from GPS positioning data of the remote vehicle.

The moving information of the nearby vehicle may include the current moving position of the nearby vehicle, a moving speed v of the nearby vehicle, a predicted curvature R of the nearby vehicle, a heading a of the nearby vehicle, and the like. The current moving position of the nearby vehicle may be obtained by a GPS of the nearby vehicle. The moving speed v of the nearby vehicle is obtained by a speed sensor of the nearby vehicle. The heading a of the nearby vehicle may be obtained from GPS positioning data of the nearby vehicle.

The future time period may be set based on a requirement. For example, the future time period may be set to a fixed value based on experience, for example, set to 10 seconds (s).

The threshold D may be set based on a requirement. This is not limited. The threshold may be set to a half of lengths of two vehicles, that is, the remote vehicle and the nearby vehicle in the direction matching the direction of the remote vehicle. For example, if a length of the vehicle 1 is 5 meters, and a length of a vehicle matching the vehicle 1 is 4.5 meters, the threshold may be set to (5+4.5)/2=4.75 meters.

In the future time period, if the shortest distance between the remote vehicle and the nearby vehicle in the direction matching the direction of the remote vehicle is greater than or equal to the threshold D, it indicates that there is no collision risk between the remote vehicle and the nearby vehicle in the direction matching the direction of the remote vehicle. In this case, there is no predicted collision time between the remote vehicle and the nearby vehicle in the direction matching the direction of the remote vehicle, and no recording is performed. In the future time period, if the shortest distance between the remote vehicle and the nearby vehicle in the direction matching the direction of the remote vehicle is less than the threshold D, it indicates that there is no collision risk between the remote vehicle and the nearby vehicle in the direction matching the direction of the remote vehicle.

The path prediction algorithm (path predication method) is intended to predict a future longitude and latitude position of the vehicle and an expression in the future time period based on running data and a predicted curvature R of the vehicle. The path prediction algorithm may be the following formula (2). In the formula (2), $x_t$ and $y_t$ are moving positions of the vehicle in a future time period t, $x_0$ and $y_0$ are current moving positions of the vehicle, v is the moving speed of the vehicle, R is the predicted curvature, R is equal to a ratio of the moving speed v of the vehicle to a yawing angular velocity of the vehicle, θ is a yawing angle of the vehicle, and the yawing angle of the vehicle is an included angle between the heading a of the vehicle and the due north direction.

$$x_t = x_0 + 2R\sin\left(\frac{vt}{2R}\right)\sin\left(\frac{vt}{2R} + \theta\right)$$
$$y_t = y_0 + 2R\sin\left(\frac{vt}{2R}\right)\cos\left(\frac{vt}{2R} + \theta\right)$$

formula (2)

For example, calculating the shortest distance between the remote vehicle and the nearby vehicle in the direction matching the direction of the remote vehicle may include:

sequentially calculating, at a plurality of times in the future time period based on the formula (2), moving positions of the remote vehicle and moving positions of the nearby vehicle matching the remote vehicle, using distances between the moving positions of the remote vehicle and the moving positions of the remote vehicle as distances between the remote vehicle and the nearby vehicle in the direction matching the direction of the remote vehicle, and using a shortest distance among the distances between the remote vehicle and the nearby vehicle as the shortest distance between the remote vehicle and the nearby vehicle in the direction matching the direction of the remote vehicle.

Using the future time period of 10 s as an example, the plurality of times in the future time period may be 0.1 s, 0.2 s, 0.3 s, . . . , and 10 s. The warning apparatus may first calculate a distance between the remote vehicle and the nearby vehicle in the direction matching the direction of the remote vehicle at 0.1 s, then calculate a distance between the remote vehicle and the nearby vehicle in the direction matching the direction of the remote vehicle at 0.2 s, then calculate a distance between the remote vehicle and the nearby vehicle in the direction matching the direction of the remote vehicle at 0.3 s, and so on, until all distances between the remote vehicle and the nearby vehicle in the direction matching the direction of the remote vehicle are calculated, and then taking a shortest distance from the calculation results as the shortest distance between the remote vehicle and the nearby vehicle in the direction matching the direction of the remote vehicle.

Step 304: Send alarm information to the driver of the ego-vehicle based on the nearby vehicle corresponding to the earliest time T among all recorded times T.

The nearby vehicle corresponding to the earliest time T among the times T when the shortest distance is less than the threshold D may be a most risky vehicle in the nearby area of the ego-vehicle. The alarm information is used to indicate to the driver that an accidental collision accident not caused by the ego-vehicle or another accidental collision accident may occur in the direction of the nearby vehicle corresponding to the earliest time T. Further, the driver may be prompted to drive carefully, or slow down, or change to a left/right lane.

In an example, the alarm information may be information in a form of a sound wave. For example, the warning apparatus may send the alarm information to the driver of the ego-vehicle by using an ECU in the ego-vehicle.

In another example, the warning apparatus may send the alarm information to the driver by using an indicator. For example, in the ego-vehicle, an indicator is disposed in a position that can be easily seen by the driver, and the indicator may emit yellow light. The warning apparatus may trigger turn-on of the indicator based on the nearby vehicle corresponding to the earliest time T among the times T when the shortest distance is less than the threshold D, that is, turn on the small yellow indicator, to send the alarm information to the driver. In this way, the driver is prompted that an accidental collision accident not caused by the ego-vehicle or another accidental collision accident may occur in the direction of the nearby vehicle corresponding to the earliest time T among the times T when the shortest distance is less than the threshold D, so that the driver drives carefully.

It should be noted that, if the alarm information is sent by using the indicator, the alarm information may indicate to the driver that a vehicle surrounding the ego-vehicle is at risk of colliding with the remote vehicle, and that the risk may affect the ego-vehicle, so that the driver drives carefully. There is no need to specify a direction in which a vehicle may have a collision risk.

In still another example, the alarm information may be sent to the driver by using a combination of the ECU and a user interface (user interface, UI). For example, the warning apparatus may send, to the driver of the ego-vehicle by using the ECU in the ego-vehicle, that an accidental collision accident not caused by the ego-vehicle or another accidental collision accident may occur, so that the driver drives carefully. In addition, the warning apparatus displays the direction of the nearby vehicle corresponding to the earliest time T on the UI, so that the driver knows in which direction a danger is likely to occur.

In still another example, the alarm information may alternatively be sent to the driver by using a combination of the indicator and the UI. For example, the warning apparatus may trigger turn-on of the indicator, to indicate to the driver that an accidental collision accident not caused by the ego-vehicle or another accidental collision accident may occur, so that the driver drives carefully. In addition, the warning apparatus displays the direction of the nearby vehicle corresponding to the earliest time T on the UI, so that the driver knows in which direction a danger is likely to occur.

For example, as shown in FIG. 6, nearby vehicles associated with the ego-vehicle include {vehicle 1, vehicle 2}, where the vehicle 1 is located on the front side, and the vehicle 2 is located on the rear side; and remote vehicles associated with the ego-vehicle include {vehicle 3, vehicle 4}, where the vehicle 3 is located on the front right side, and the vehicle 4 is located on the rear side. Based on the collision direction matching rule shown in Table 1, it can be learned that the nearby vehicles in the direction matching the direction of the vehicle 3 include {vehicle 1, vehicle 2}, and that the nearby vehicles in the direction matching the direction of the vehicle 4 include {vehicle 2}. Using the future time period of 10 s as an example, at intervals of 0.1 starting from 0.1 s, a distance between the vehicle 3 and the vehicle 1 at 0.1 s and a distance between the vehicle 3 and the vehicle 1 at 0.2 s are iteratively calculated based on the formula (2), until all distances between the vehicle 3 and the vehicle 1 within 10 s are calculated, and a time T1 when the shortest distance between the vehicle 3 and the vehicle 1 is less than the threshold D is recorded. Similarly, a time T2 when the shortest distance between the vehicle 3 and the vehicle 2 is less than the threshold D is calculated and recorded, and a time T3 when the shortest distance between the vehicle 4 and the vehicle 2 is less than the threshold D is calculated and recorded. T1, T2, and T3 are compared. If T2 is the earliest, the driver is prompted that a danger may occur on the rear right side of the vehicle 2 corresponding to T2, so that the driver drives carefully.

Based on the method shown in FIG. 3, a nearby vehicle and a remote vehicle surrounding the ego-vehicle and associated with the ego-vehicle may be determined, and a collision risk between vehicles surrounding the ego-vehicle is analyzed in advance based on the collision direction matching rule and the path prediction algorithm. For example, the time T when the shortest distance between the nearby vehicle and the remote vehicle is less than the threshold D is calculated and recorded, the vehicle corresponding to the earliest time T among the times T when the shortest distance is less than the threshold D is used as the most risky vehicle in the nearby area of the ego-vehicle, and the driver is prompted to note the risk. In this way, when the vehicle is moving, a safety risk caused by a possible collision accident between a vehicle near the ego-vehicle and another vehicle to moving of the ego-vehicle is identified in advance, and the ego-vehicle is warned, so that the driver can perform prevention or avoidance in advance, thereby improving a safety warning capability of the vehicle and improving driving safety of the vehicle driven by the user.

In the first scenario of the method shown in FIG. 3, the target classification algorithm (target classification method) is an existing algorithm Assuming that the ego-vehicle is the ego-vehicle and that the directions relative to the ego-vehicle are eight directions, the target classification algorithm is described in detail as follows: receiving moving information of other vehicles surrounding the ego-vehicle; using the other vehicles surrounding the ego-vehicle as target vehicles:

screening out, based on moving information of the target vehicles and moving information of the ego-vehicle, target vehicles associated with the ego-vehicle during moving (having a potential risk), and filtering out target vehicles not associated with the ego-vehicle during moving (not having a potential risk); and classifying the target vehicles associated with the ego-vehicle into eight vehicle sets based on a relative position relationship with the ego-vehicle, that is, vehicle sets in the eight directions: the front side, the front right side, the front left side, the front left side, the left side, the right side, the rear left side, the rear right side, and the rear side.

If a target vehicle satisfies any one or more of the following conditions (1) to (3), it is determined that the target vehicle is a vehicle not associated with the ego-vehicle: (1) If the target vehicle moves opposite the ego-vehicle and is located on the left side, the right side, the rear left side, the rear right side, or the rear side, and a heading angle difference is greater than ±80 degrees, it is determined that the target vehicle is a vehicle not associated with the ego-vehicle.

(2) If the target vehicle moves in the same direction as the ego-vehicle and is located on the front side, the front left side, or the front right side, and the speed v×sin θ of the target vehicle minus the moving speed v of the ego-vehicle is greater than 0, it is determined that the target vehicle is a vehicle not associated with the ego-vehicle.

(3) If the target vehicle moves in the same direction as the ego-vehicle and is located on the rear side, the rear left side, or the rear right side, and the speed v of the ego-vehicle minus the speed v×sin θ of the target vehicle is greater than 0, it is determined that the target vehicle is a vehicle not associated with the ego-vehicle.

θ=arctan (AC/BC), a longitude and latitude of the target vehicle are (x1, y1), a longitude and latitude of the ego-vehicle are (x0, y0), AC is equal to y1−y0, and BC is equal to x1−x0.

In a second scenario of the method shown in FIG. 3, the deceleration a, the response time Δt of the driver, and the safety distance A in the formula (1) may be preset based on experience or adjusted by the user based on a requirement, so that the user can adjust the nearby area of the vehicle based on an appropriate driving capability of the user and obtain a more suitable and accurate warning and reminding effect based on the specified nearby area.

For example, the deceleration a, the response time Δt of the driver, and the safety distance A may be set based on an actual requirement of the driver (for example, the driving capability of the driver). For example, after starting to drive the ego-vehicle, the driver may input the deceleration a, the response time Δt of the driver, and the safety distance A into the ego-vehicle through a human-machine interaction interface of the ego-vehicle based on a situation of the driver, so that the warning apparatus determines the nearby area of the ego-vehicle based on the input speed a, response time Δt of the driver, and safety distance A, and the formula (1).

Further, the warning apparatus may periodically calculate, by using the method shown in FIG. 3, the nearby vehicle corresponding to the earliest time T among the times T when the shortest distance is less than the threshold D, and send alarm information based on a calculation result.

The period may be set to 100 milliseconds or another time length. This is not limited. Assuming that the period is 100 milliseconds, the warning apparatus may perform, once every 100 milliseconds, the ego-vehicle warning method shown in FIG. 3.

In the process in which the warning apparatus periodically performs the method shown in FIG. 3, the warning apparatus may cancel the alarm information based on a moving status of the vehicle, and initiate new alarm information. Specifically, the method is shown in FIG. 7A and FIG. 7B.

Figure 7A:
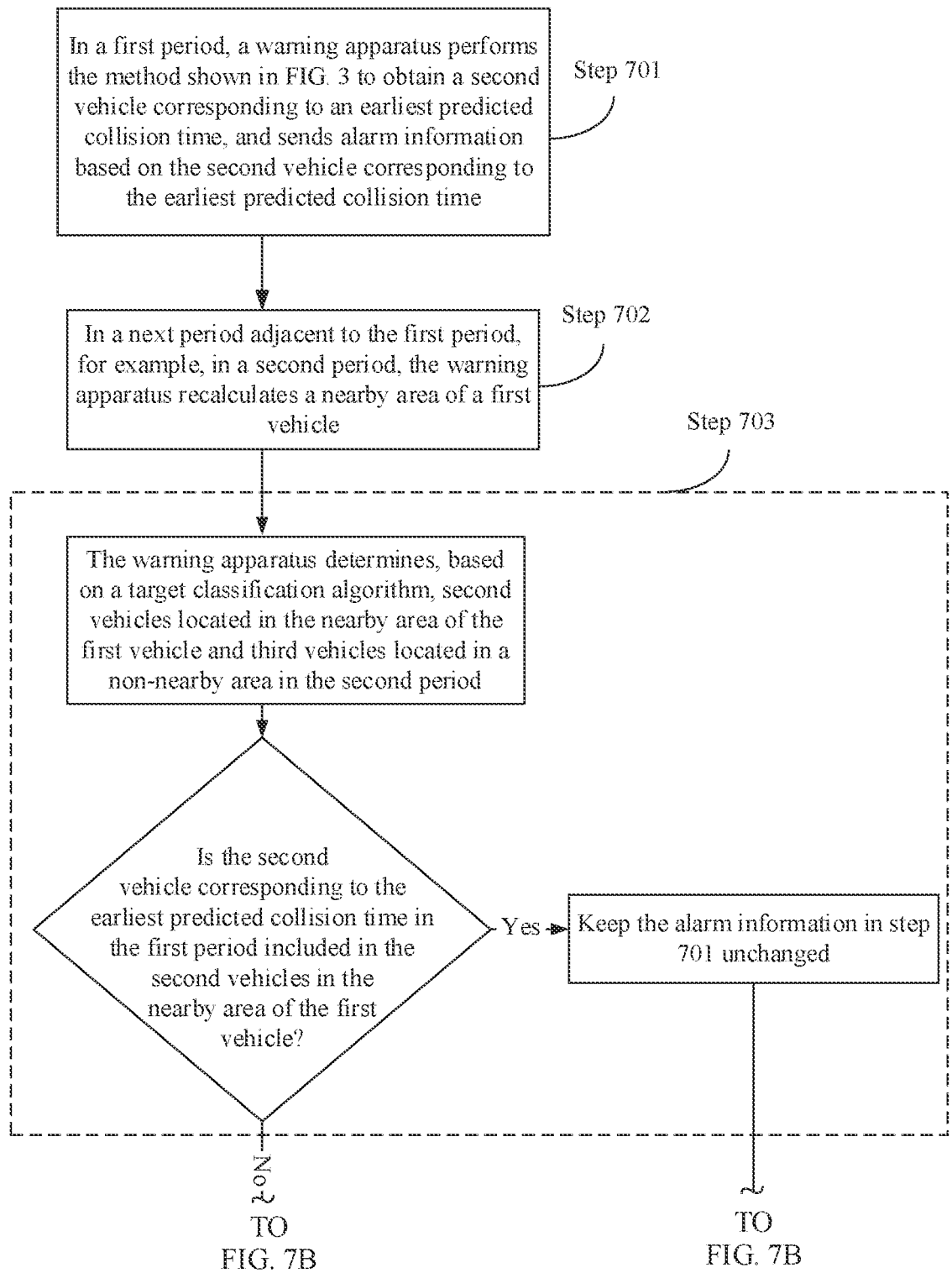
FIG. 7A and FIG. 7B are a schematic diagram of composition of another ego-vehicle warning method according to an embodiment of this application.
Figure 7B:
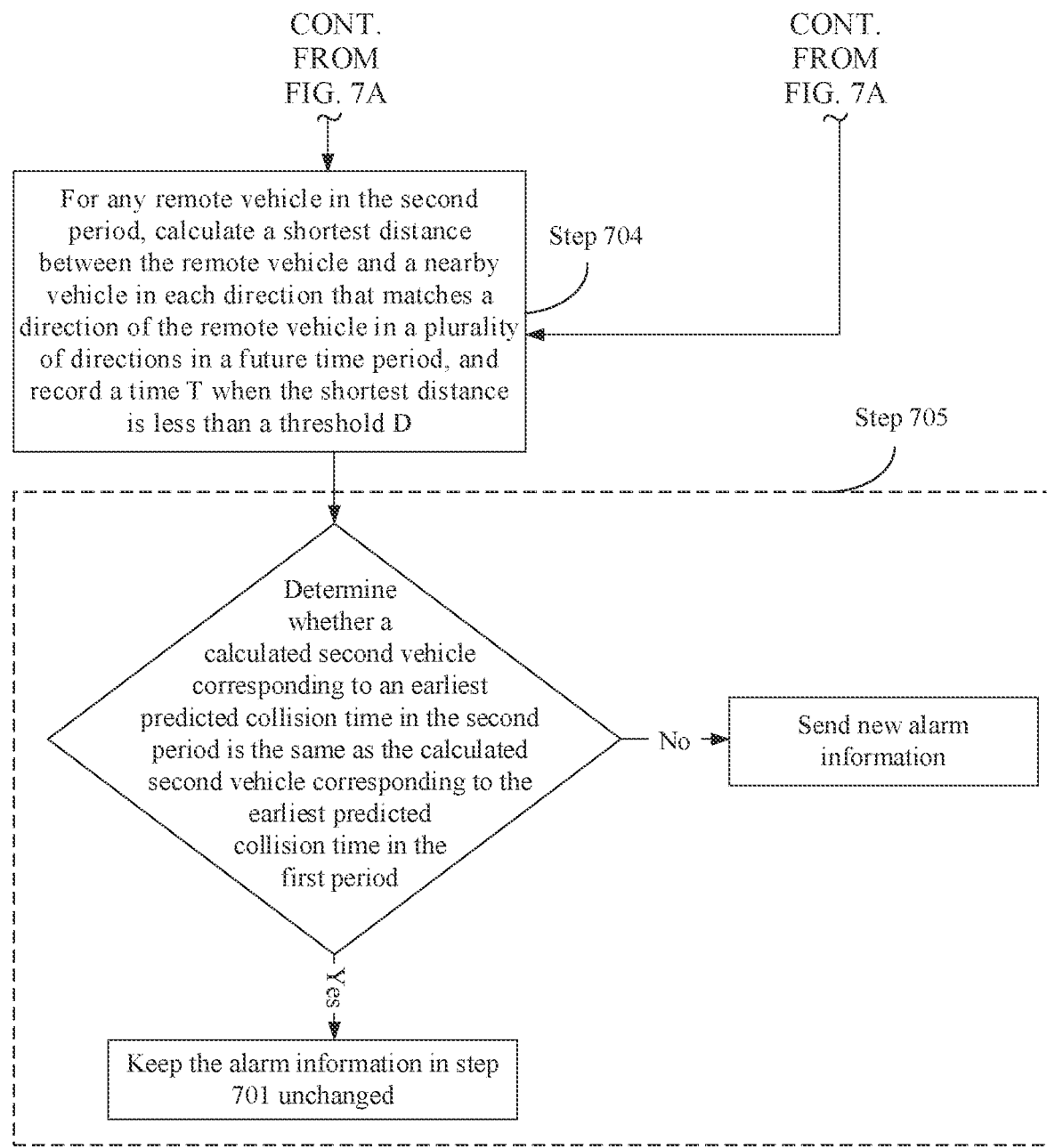

FIG. 7A and FIG. 7B are a flowchart of another ego-vehicle warning method according to an embodiment of this application. As shown in FIG. 7A and FIG. 7B, the method is performed by a warning apparatus, and the method may include the following steps.

Step 701: In a first period, a warning apparatus performs the method shown in FIG. 3 to obtain a nearby vehicle corresponding to an earliest time T among times T when a shortest distance is less than a threshold D. and sends alarm information based on the nearby vehicle corresponding to the earliest time T among the times T when the shortest distance is less than the threshold D.

For step 701, refer to step 304. Details are not described again.

Step 702: In a next period adjacent to the first period, for example, in a second period, the warning apparatus recalculates a nearby area of an ego-vehicle.

For a method for recalculating the nearby area of the ego-vehicle by the warning apparatus, refer to step 301. Details are not described again.

Step 703: The warning apparatus determines, based on a target classification algorithm, nearby vehicles located in the nearby area of the ego-vehicle and remote vehicle sets located in a non-nearby area in the second period, and determines whether the nearby vehicle corresponding to the earliest time T among the times T when the shortest distance is less than the threshold D in the first period is included in the determined nearby vehicles in the nearby area of the ego-vehicle. If the nearby vehicle corresponding to the earliest time T among the times T when the shortest distance is less than the threshold D in the first period is not included in the nearby vehicles in the nearby area of the ego-vehicle, alarm cancellation information is sent, and step 704 is performed; or if the nearby vehicle corresponding to the earliest time T among the times T when the shortest distance is less than the threshold D in the first period is included in the nearby vehicles in the nearby area of the ego-vehicle, step 704 is performed.

The alarm cancellation information may be used to indicate to a driver that an accident in a direction of the nearby vehicle corresponding to the earliest time T among the times T when the shortest distance is less than the threshold D is cleared. For example, if the nearby vehicle corresponding to the earliest time T among the times T when the shortest distance is less than the threshold D in the first period is a vehicle 2, and the vehicle 2 is located on a rear right side of the ego-vehicle, the alarm cancellation information may indicate to the driver that an accident on the rear right side of the driver is cleared.

For example, the warning apparatus may send the alarm cancellation information to the driver of the ego-vehicle by using an ECU in the ego-vehicle; or the warning apparatus sends the alarm cancellation information to the driver by turning off an indicator.

For example, for the process in which the warning apparatus determines, based on the target classification algorithm, the nearby vehicles located in the nearby area of the ego-vehicle and remote vehicles located in the non-nearby area in the second period, refer to step 301. Details are not described again.

Step 704: For any remote vehicle in the second period, calculate a shortest distance between the remote vehicle and a nearby vehicle in each direction that matches a direction of the remote vehicle in a plurality of directions in a future time period, and record a time T when the shortest distance is less than the threshold D.

For step 704, refer to step 303. Details are not described again.

Step 705: Determine whether the calculated nearby vehicle corresponding to the earliest time T among the times T when the shortest distance is less than the threshold D in the second period is the same as the calculated nearby vehicle corresponding to the earliest time T among the times T when the shortest distance is less than the threshold D in the first period, that is, determine whether the most threatening vehicle in the nearby area of the ego-vehicle is the original vehicle; and if the calculated nearby vehicle corresponding to the earliest time T among the times T when the shortest distance is less than the threshold D in the second period is different from the nearby vehicle corresponding to the earliest time T among the times T when the shortest distance is less than the threshold D in the first period, send new alarm information: otherwise, keep the alarm information in step 701 unchanged.

The new alarm information may be used to indicate that an accidental collision accident not caused by the ego-vehicle or another accidental collision accident may occur in the direction of the nearby vehicle corresponding to the earliest time T among the times T when the shortest distance is less than the threshold D in the second period, so that the driver drives carefully.

For example, for a manner in which the warning apparatus sends the new alarm information, refer to the description in step 303. Details are not described again.

Based on the method shown in FIG. 7A and FIG. 7B, the warning apparatus may periodically detect whether there is a threatening vehicle surrounding the ego-vehicle, feed back a direction of a most threatening vehicle to the driver, prompt the driver that there is a danger in the direction, so that the driver drives carefully, and when the threat is cleared, cancel an alarm, thereby improving vehicle driving safety.

The solutions provided in the embodiments of this application are described above mainly from a perspective of the warning apparatus performing the ego-vehicle warning method provided in the embodiments of this application. It may be understood that, to implement the foregoing functions, the warning apparatus includes corresponding hardware structures and/or software modules for performing the functions. A person skilled in the art should easily be aware that, in combination with the examples described in the embodiments disclosed in this specification, algorithms steps may be implemented by hardware or a combination of hardware and computer software. Whether a function is implemented by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the warning apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 8:
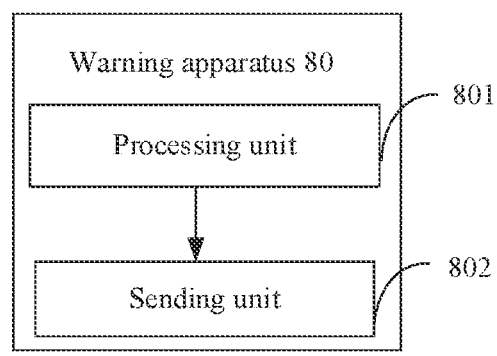
FIG. 8 is a schematic diagram of composition of a warning apparatus 80 according to an embodiment of this application.

FIG. 8 is a schematic diagram of composition of a warning apparatus 80 according to an embodiment of this application. The warning apparatus 80 may be a functional module in an ego-vehicle, or a chip or a system-on-chip in an ego-vehicle. As shown in FIG. 8, the warning apparatus 80 may include a processing unit 801 and a sending unit 802.

The processing unit 801 is configured to: determine a nearby area of the ego-vehicle based on moving information of the ego-vehicle: perform target classification on vehicles surrounding the ego-vehicle to obtain nearby vehicles in a plurality of directions and remote vehicle sets in the plurality of directions, where a nearby vehicle in each direction is a vehicle closest to the ego-vehicle in the nearby area in the direction, and a remote vehicle set in each direction includes a remote vehicle located outside the nearby area in the direction; and for any remote vehicle, calculate a shortest distance between the remote vehicle and a nearby vehicle in each direction that matches a direction of the remote vehicle in the plurality of directions in a future time period, and record, in a memory, a time T when the shortest distance is less than a threshold D. For example, the processing unit 801 supports the warning apparatus 80 in performing step 301, step 302, and step 303.

The sending unit 802 is configured to send alarm information to a driver of the ego-vehicle based on a nearby vehicle corresponding to an earliest time T among all recorded times T, where the alarm information is used to indicate to the driver that an accidental collision accident not caused by the ego-vehicle or another accidental collision accident may occur in a direction of the nearby vehicle corresponding to the earliest time T. For example, the sending unit 802 supports the warning apparatus 80 in performing step 304.

Specifically, all related content of steps in the foregoing method embodiments shown in FIG. 3 and FIG. 7A and FIG. 7B may be cited in function descriptions of corresponding functional modules of the warning apparatus 80. Details are not described herein again. In this possible design, the warning apparatus 80 is configured to perform each step of the ego-vehicle warning methods shown in FIG. 3 and FIG. 7A and FIG. 7B, and can achieve a same effect as the foregoing ego-vehicle warning methods.

It should be noted that, in another implementation, the processing unit 801 in FIG. 8 may be replaced with an MCU, and the MCU may integrate functions of the processing unit 801. The sending unit 802 in FIG. 8 may be replaced with a CAN processor, and the CAN processor may integrate functions of the sending unit 802. Further, the warning apparatus 80 shown in FIG. 8 may further include a memory.

When the processing unit 801 is replaced with the MCU, and the sending unit 802 is replaced with the CAN processor, the warning apparatus 80 in this embodiment of this application may be the warning apparatus shown in FIG. 2b.

The foregoing descriptions about the implementations allow a person skilled in the art to clearly understand that, for a purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may be or may not be physically separate, and components displayed as units may be one or more physical units, that is, may be located in one place, or may be distributed in a plurality of different places. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
    determining, by a processor, a nearby area of an ego-vehicle based on first moving information of the ego-vehicle;
    performing, by the processor, a target classification on a plurality of vehicles surrounding the ego-vehicle;
    obtaining, by the processor and based on the target classification, a plurality of nearby vehicles in a plurality of directions and a plurality of remote vehicle sets in the directions, wherein a first nearby vehicle of the nearby vehicles in each of the directions is closest to the ego-vehicle in the nearby area in each of the directions, and wherein a first remote vehicle set of the remote vehicle sets in each of the directions comprises a first remote vehicle located outside the nearby area in each of the directions;
    calculating, by the processor and for the first remote vehicle, a shortest distance between the first remote vehicle and a second nearby vehicle in each of the directions that matches a first direction of the first remote vehicle in the directions in a future time period;
    recording, by the processor and for the first remote vehicle, a first time when the shortest distance is less than a threshold; and
    sending, by the processor, alarm information to a driver of the ego-vehicle based on a third nearby vehicle corresponding to an earliest time among all recorded times, wherein the alarm information indicates to the driver that a first accident not caused by the ego-vehicle or a second accident may occur in a second direction of the third nearby vehicle.

2. The method of claim 1, wherein the first moving information comprises a current moving speed (v) of the ego-vehicle, a heading of the ego-vehicle, and a yawing rate of the ego-vehicle, and wherein the method further comprises determining the nearby area based on a deceleration (a) of the ego-vehicle, a response time ($\Delta t$) of the driver, a safety distance (A), the heading, and the yawing rate.

3. The method of claim 2, wherein, $\Delta t$, and A are preset based on experience or adjusted by a user based on a requirement.

4. The method of claim 1, further comprising:
    obtaining second moving information of the vehicles;
    determining vehicle sets in the directions based on the second moving information and a vehicle kinematics algorithm, wherein a first vehicle set of the vehicle sets in each of the directions comprises a first vehicle that is located in each of the directions and associated with the ego-vehicle among the vehicles;
    determining a second vehicle that is in the first vehicle set and is located in the nearby area and closest to the ego-vehicle as a fourth nearby vehicle; and
    determining a third vehicle that is in the first vehicle set and is located outside the nearby area as a second remote vehicle in the first remote vehicle set.

5. The method of claim 1, further comprising:
    obtaining a first analytic path prediction expression of the second nearby vehicle based on a path prediction algorithm and second moving information of the second nearby vehicle, wherein the first analytic path prediction expression is a first relationship between a second time and a first moving position of the second nearby vehicle;
    obtaining a second analytic path prediction expression vehicle based on the path prediction algorithm and second moving information of the first remote vehicle, wherein the second analytic path prediction expression is a second relationship between a third time and a second moving position of the first remote vehicle; and
    calculating the shortest distance based on the first analytic path prediction expression of the nearby vehicle and the second analytic path prediction expression.

6. The method of claim 1, further comprising:
    sending the alarm information to the driver using an electronic control unit (ECU);

sending the alarm information to the driver using an indicator; or sending the alarm information to the driver using an ECU and a user interface (UI).

7. An apparatus, comprising:
a memory;
a micro control unit (MCU) coupled to the memory and configured to:
  determine a nearby area of an ego-vehicle based on first moving information of the ego-vehicle;
  perform a target classification on a plurality of vehicles surrounding the ego-vehicle;
  obtain, based on the target classification, a plurality of nearby vehicles in a plurality of directions and a plurality of remote vehicle sets in the directions, wherein a first nearby vehicle of the nearby vehicles in each of the directions is closest to the ego-vehicle in the nearby area in each of the directions, and wherein a first remote vehicle set of the remote vehicle sets in each of the directions comprises a first remote vehicle located outside the nearby area in each of the directions;
  calculate, for the first remote vehicle, a shortest distance between the first remote vehicle and a second nearby vehicle in each of the directions that matches a first direction of the first remote vehicle in the directions in a future time period; and
  record, in the memory, a first time when the shortest distance is less than a threshold; and
a Controller Area Network (CAN) processor coupled to the memory and the MCU and configured to send alarm information to a driver of the ego-vehicle based on a third nearby vehicle corresponding to an earliest time among all recorded times,
wherein the alarm information indicates to the driver that a first accident not caused by the ego-vehicle or a second accident may occur in a second direction of the third nearby vehicle.

8. The apparatus of claim 7, further comprising a global navigation satellite system (GNSS) receiver coupled to the memory, the MCU, and the CAN processor and configured to obtain, from a GNSS, the first moving information comprising a current moving speed (v) of the ego-vehicle, a heading of the ego-vehicle, and a yawing rate of the ego-vehicle, wherein the MCU is further configured to further determine the nearby area based on a deceleration (a) of the ego-vehicle, a response time ($\Delta t$) of the driver, a safety distance (A), the heading, and the yawing rate.

9. The apparatus of claim 8, wherein, $\Delta t$, and A are preset based on experience or adjusted by a user based on a requirement.

10. The apparatus of claim 7, further comprising a vehicle-to-everything (V2X) radio transceiver coupled to the memory, the MCU, and the CAN processor and configured to obtain second moving information of the vehicles, wherein the MCU is further configured to:
  determine vehicle sets in the directions based on the second moving information and a vehicle kinematics algorithm, wherein a first vehicle set of the vehicle sets in each of the directions comprises a first vehicle that is located in each of the directions and associated with the ego-vehicle among the vehicles;
  determine a second vehicle that is in the first vehicle set and is located in the nearby area and closest to the ego-vehicle as a fourth nearby vehicle, and
  determine a third vehicle that is in the first vehicle set and is located outside the nearby area as a second remote vehicle in the first remote vehicle set.

11. The apparatus of claim 7, wherein, for the first remote vehicle, the MCU is further configured to:
  obtain a first analytic path prediction expression of the second nearby vehicle based on a path prediction algorithm and second moving information of the second nearby vehicle, wherein the first analytic path prediction expression is a first relationship between a second time and a first moving position of the second nearby vehicle;
  obtain a second analytic path prediction expression of the first remote vehicle based on the path prediction algorithm and third moving information of the first remote vehicle, wherein the second analytic path prediction expression is a second relationship between a third time and a second moving position of the first remote vehicle; and
  further calculate the shortest distance based on the first analytic path prediction expression and the second analytic path prediction expression.

12. The apparatus of claim 7, wherein the CAN processor is further configured to:
  further send the alarm information to the driver using an electronic control unit (ECU);
  further send the alarm information to the driver using an indicator; or
  further send the alarm information to the driver using an ECU and a user interface (UI).

13. A vehicle comprising:
an apparatus comprising:
  a memory;
  a micro control unit (MCU) coupled to the memory and configured to:
    determine a nearby area of an ego-vehicle based on first moving information of the ego-vehicle;
    perform a target classification on a plurality of vehicles surrounding the ego-vehicle;
    obtain, based on the target classification, a plurality of nearby vehicles in a plurality of directions and a plurality of remote vehicle sets in the directions, wherein a first nearby vehicle of the nearby vehicles in each of the directions is closest to the ego-vehicle in the nearby area in each of the directions, and wherein a first remote vehicle set of the remote vehicle sets in each of the directions comprises a first remote vehicle located outside the nearby area in each of the directions;
    calculate, for the first remote vehicle, a shortest distance between the first remote vehicle and a second nearby vehicle in each of the directions that matches a first direction of the first remote vehicle in the directions in a future time period; and
    record, in the memory, a first time when the shortest distance is less than a threshold; and
  a Controller Area Network (CAN) processor coupled to the memory and the MCU and configured to send alarm information to a driver of the ego-vehicle based on a third nearby vehicle corresponding to an earliest time among all recorded times,
  wherein the alarm information indicates to the driver that a first accident not caused by the ego-vehicle or a second accident may occur in a second direction of the third nearby vehicle.

14. The vehicle of claim 13, wherein the apparatus further comprises a global navigation satellite system (GNSS) receiver coupled to the memory, the MCU, and the CAN processor and configured to obtain, from a GNSS, the first moving information comprising a current moving speed of the ego-vehicle (v), a heading of the ego-vehicle, and a yawing rate of the ego-vehicle, and wherein the MCU is further configured to further determine the nearby area based on a deceleration (a) of the ego-vehicle, a response time ($\Delta t$) of the driver, a safety distance (A), v, the heading, and the yawing rate.

15. The vehicle of claim 14, wherein a, $\Delta t$, and A are preset based on experience or adjusted by a user based on a requirement.

16. The vehicle of claim 13, wherein the apparatus further comprising a vehicle-to-everything (V2X) radio transceiver coupled to the memory, the MCU, and the CAN processor and configured to obtain second moving information of the vehicles, and wherein the MCU is further configured to:
   determine vehicle sets in the directions based on the second moving information and a vehicle kinematics algorithm, wherein a first vehicle set of the vehicle sets in each of the directions comprises a first vehicle that is located in each of the directions and associated with the ego-vehicle among the vehicles;
   determine a second vehicle that is in the first vehicle set and is located in the nearby area and closest to the ego-vehicle as a fourth nearby vehicle; and
   determine a third vehicle that is in the first vehicle set and is located outside the nearby area as a second remote vehicle in the first remote vehicle set.

17. The vehicle of claim 13, wherein, for the first remote vehicle, the MCU is further configured to:
   obtain a first analytic path prediction expression of the second nearby vehicle based on a path prediction algorithm and second moving information of the second nearby vehicle, wherein the first analytic path prediction expression is a first relationship between a second time and a first moving position of the second nearby vehicle;
   obtain a second analytic path prediction expression of the first remote vehicle based on the path prediction algorithm and third moving information of the first remote vehicle, wherein the second analytic path prediction expression is a second relationship between a third time and a second moving position of the first remote vehicle; and
   further calculate the shortest distance based on the first analytic path prediction expression and the second analytic path prediction expression.

18. The vehicle of claim 13, wherein the CAN processor is further configured to further send the alarm information to the driver using an electronic control unit (ECU).

19. The vehicle of claim 13, wherein the CAN processor is further configured to further send the alarm information to the driver using an indicator.

20. The vehicle of claim 13, wherein the CAN processor is further configured to further send the alarm information to the driver using an electronic control unit (ECU) and a user interface (UI).

* * * * *

UNITED STATES PATENT AND TRADEMARK OFFICE
CERTIFICATE OF CORRECTION

PATENT NO. : 11,807,261 B2
APPLICATION NO. : 17/635809
DATED : November 7, 2023
INVENTOR(S) : Hao Zhang Page 1 of 1

It is certified that error appears in the above-identified patent and that said Letters Patent is hereby corrected as shown below:

In the Claims

Claim 5, Column 26, Line 57: "vehicle based" should read "of the first remote vehicle based"

Claim 5, Column 26, Line 63: "expression of the nearby vehicle and" should read "expression and"

Claim 8, Column 27, Line 50: "(A), the heading, and" should read "(A), v, the heading, and"

Signed and Sealed this
Second Day of January, 2024

Katherine Kelly Vidal
*Director of the United States Patent and Trademark Office*